(12) United States Patent
Bucci et al.

(10) Patent No.: US 6,823,315 B1
(45) Date of Patent: Nov. 23, 2004

(54) DYNAMIC WORKFORCE SCHEDULER

(75) Inventors: Mark E. Bucci, Sandwich, MA (US); Joseph A. Velazquez, Hopkinton, MA (US); Paul J. Piccolomini, Leominster, MA (US)

(73) Assignee: Kronos Technology Systems Limited Partnership, Chelmsford, MA (US)

( * ) Notice: Subject to any disclaimer, the term of this patent is extended or adjusted under 35 U.S.C. 154(b) by 665 days.

(21) Appl. No.: 09/599,016

(22) Filed: Jun. 21, 2000

Related U.S. Application Data

(60) Provisional application No. 60/163,304, filed on Nov. 3, 1999.

(51) Int. Cl.[7] .............................................. G06F 17/60
(52) U.S. Cl. .............................................. 705/9; 705/7
(58) Field of Search ........................................ 705/9, 7

(56) References Cited

U.S. PATENT DOCUMENTS

| | | | |
|---|---|---|---|
| 4,852,001 A | 7/1989 | Tsushima | 364/401 |
| 5,111,391 A | 5/1992 | Fields et al. | 364/401 |
| 5,164,897 A | 11/1992 | Clark et al. | 364/401 |
| 5,182,705 A | 1/1993 | Barr et al. | 364/401 |
| 5,325,292 A | 6/1994 | Crockett | 364/401 |
| 5,408,663 A * | 4/1995 | Miller | 395/650 |

FOREIGN PATENT DOCUMENTS

| | | | |
|---|---|---|---|
| EP | 1 246 097 A1 * | 3/2001 | G06F/17/60 |

OTHER PUBLICATIONS

"Kronos introduces retail workforce management system", M2 Presswire, May 18, 1995.*

Brusco, Michael. "Solving personnel tour scheduling problems using the dual all–intger cutting plane", IIE Transactions; NoRcross; Sep. 1998.*

Brusco, Michael and Larry Jacobs. "Personeel tour scheduling when starting–time restrictions are present", Management Science, Providence; Apr. 1998.*

Thompson, G.M., "A Simulated–Annealing Heuristic for Shift Scheduling Using Non–Continuously Available Employees," *Computers Ops Res.,* vol. 23, No. 3, pp. 275–288 (1996).

Fleischer, J., "Labor Scheduling Beyond the Checkout," *RT Magazine,* Jan. 1998.

Fox, B., "Bagger's Brainstorm Becomes HeurisTec's Labor Software," *RT Magazine* (Sep. 1997).

"SuperSked Automated Labor Scheduling System." *HeurisTec Product Brochure,* date unknown.

"HeurisTec's SuperSked Automated Labor Scheduling Software," http://ucsu.colorado.edu/~hannahi/Heuristec.html, Apr. 19, 1999.

Glover, F. and McMillan, C., "The General Employee Scheduling Problem: An Integration of MS and AI," *Center for Applied Artificial Intelligence, Graduate School of Business, University of Colorado, Boulder, CO 80309,* pp. 563–573, date unknown.

Glover, F., "Tabu Search—Part I," *ORSA Journal on Computing,* vol. I No. 3 pp. 190–206, Summer 1989.

Thomas, P.R. and Salhi, S., "A Tabu Search Approach for the Resource Constrained Project Scheduling Problem," *Journal of Heuristics,* 4:123–139 (1998).

* cited by examiner

*Primary Examiner*—Susanna Meinecke-Díaz
*Assistant Examiner*—Johnna Stimpak
(74) *Attorney, Agent, or Firm*—Weingarten, Schurgin, Gagnebin & Lebovici LLP

(57) ABSTRACT

A method of dynamically scheduling a workforce includes obtaining workforce requirements, attributes and employee preferences, determining a workforce schedule based on the workforce requirements and attributes, determining a schedule value based on workforce requirements and employee preferences, and iteratively modifying the workforce schedule, determining a schedule value based on workforce requirements and preferences for the modified workforce schedule, and comparing schedule values to determine a best workforce schedule.

12 Claims, 23 Drawing Sheets

83
SHIFT DESCRIPTION

80

| 81<br>SHIFT ID | 85<br>START | 87<br>LENGTH | 89<br>JOB |
|---|---|---|---|
| 0 | SUN 12 A | 2.0 HRS | 1 |
| 1 | SUN 12 A | 2.5 HRS | 1 |
| 2 | SUN 12 A | 3.0 HRS | 1 |
| ⋮ | ⋮ | ⋮ | ⋮ |
| 12,479 | SAT 11:30 A | 8.0 HRS | 20 |

*FIG. 10*

DYNAMIC WORKFORCE SCHEDULER

RELATED APPLICATION

This application claims the benefit of U.S. Provisional Application No. 60/163,304 filed Nov. 3, 1999, the entire teachings of which are incorporated herein by reference.

BACKGROUND OF THE INVENTION

The present invention relates to scheduling workshifts for employees based on work requirements. Scheduling is typically done in incremental time periods, such as 15-minute periods.

For example, a supermarket may need four baggers and five cashiers between 9:15 AM and 1:15 PM, and only two baggers and three cashiers from 1:15 PM until 5:30 PM, at which time the need may again be elevated. Of course, scheduling must be satisfied from the existing pool of employees. At the same time, many rules or constraints must also be satisfied. These rules include minimum and maximum hours for a given employee, rules related to employment of minors, rules relating to break times, rules dictated by union contracts, etc.

In the not-too-distant past, of course, scheduling was performed manually by a manager who sat down at a table with pencil, paper, or more recently with a spreadsheet or other simple computer program, and who filled in the schedule with the names of employees. After filling in the schedule, the manager might check that no rules have been broken.

While this method may still be performed in many small shops, it is wasteful of the manager's time, and does not lead to efficient scheduling. In particular, such a method is highly impractical for a medium-to-large-scale operation comprising tens to thousands of employees.

More recently, computer methods have been developed to determine near-optimal schedules from the myriad of possible schedules. In particular, Gary M. Thompson, *A Simulated-Annealing Heuristic For Shift Scheduling Using Non-Continuously Available Employees*, Computers Ops. Res. Vol. 23, No.3, pp 275–288 (1996), incorporated herein by reference, describes a method of scheduling workshifts using a "simulated annealing" process which heuristically develops a trial schedule from an "incumbent" schedule, and compares the trial schedule both with the incumbent schedule and the best schedule found so far. Comparisons are made between values of an "objective" function, calculated for each schedule.

Generally, according to Thompson, a trial schedule which is "better" than the "best" schedule determined thus far, replaces both the best and incumbent (or current) schedules, while a trial schedule which is better than just the incumbent replaces only the incumbent schedule. However, a trial schedule which is not better than the incumbent may still replace the incumbent, depending on a randomized annealing function. The advantage of simulated annealing is that it generates new solutions iteratively, exploring areas that other algorithms fail to examine.

SUMMARY OF THE INVENTION

Thompson's objective function relies on several factors, in particular, cost, underscheduling and overscheduling. However, Thompson does not take into account employee preferences, such as preferred hours, preferred jobs, etc. Furthermore, Thompson assumes homogeneously-skilled employees.

It is an objective of the present invention to develop a cost-effective workforce schedule based on workforce requirements, using a simulated annealing function while considering all of the above factors including employee preferences and job skills. Jobs requiring different skills or activities can be listed in preferential order for each employee. While not essential, in most cases, this is based on the employee's skill level. Furthermore, the schedule must comply with certain constraints such as hours rules, minor rules, break rules, etc.

The weights assigned to employee preferences can be based on any data maintained, for example, in a database. For example, weights could be based wholly or in part on seniority, residential distance from the employer, zip code, age, and so on.

Accordingly, a method of dynamically scheduling a workforce comprises obtaining workforce requirements, attributes and preferences, determining a workforce schedule based on the workforce requirements and attributes, determining a schedule value, or cost, based on workforce requirements and preferences, and iteratively modifying the workforce schedule, determining a schedule value based on workforce requirements and preferences for the modified workforce schedule, and comparing schedule values to determine a best workforce schedule.

Determining a workforce schedule includes determining shifts and assigning employees to the shifts.

Specific steps performed by a particular embodiment include determining workforce requirements for a given time period. Then, responsive to the workforce requirements, an initial workforce schedule is determined for the given time period by determining shifts and assigning employees to the shifts, designating the initial workforce schedule as a trial workforce schedule and a best workforce schedule, and determining a value associated with the best workforce schedule responsive to the best workforce schedule, the workforce requirements and employee preferences. Next, the trial workforce schedule is modified. A value associated with the trial workforce schedule is determined based on the trial workforce schedule, the workforce requirements and employee preferences. If the value associated with the trial workforce schedule indicates a better match to the workforce requirements than a value associated with the best workforce schedule, the trial workforce schedule is designated as the best workforce schedule. This process is repeated for a predetermined number of iterations, after which the best workforce schedule is selected.

The value associated with the trial workforce schedule is further responsive to overscheduling and underscheduling of employees in each period. Furthermore, overscheduling, underscheduling and employee preferences can be weighted with respect to each other. In a particular embodiment, each job is associated with a weighting factor, which is applied where the associated job is scheduled. Similarly, in a particular embodiment, each period is associated with a weighting factor which is applied to the associated period.

In a particular embodiment, weights are set by a user.

Employee preferences can comprise, for example, preferred availability, preferred jobs, preferred days off, and/or a preferred total number of hours assigned for some duration, such as a week.

Furthermore, in a particular embodiment, employee preferences are weighted per employee. Such weighting can be, for example, according to seniority, or work status.

In a particular embodiment, the trial workforce schedule is modified by removing shifts, e.g., costly shifts, from the trial workforce schedule, adding shifts to the trial workforce schedule, and replacing shifts in the trial workforce schedule. Costly shifts are removed, in one embodiment, by repeatedly selecting a first predetermined number of most costly shifts and randomly removing one of the selected most costly shifts until some predetermined number of costly shifts have been removed.

The process of generating a schedule, e.g., adding shifts to a schedule, is aided in a particular embodiment by maintaining a scheduled employee list, a shift lookup table, and period totals.

Shifts can be added to the schedule by generating a list of candidate shifts that can be scheduled for a selected job, start time and stop time, and for each candidate shift. A most cost-reducing employee in a shift region who can fill the candidate shift is determined, and, if overall cost of adding this shift is less than costs corresponding to a predetermined number of lowest cost shifts thus far determined, added to a temporary list of lowest cost shifts. Finally, one of the candidate shifts in the temporary list is randomly selected, and added to the trial workforce schedule.

Shifts are replaced in a particular embodiment by initially stretching, shrinking or moving breaks around within a shift responsive to marginal cost data and marginal dissatisfaction costs. A replacement cost is calculated for every shift whose cost can be reduced. Finally, a lowest cost replacement is repeatedly determined, replacing the shift replaced with the replacement and the replacement cost of other shifts recalculated.

In a particular embodiment, the value of the objective function is a weighted sum of overscheduling and underscheduling over all periods and all jobs for a given duration, and employee dissatisfaction over all employees. Employee dissatisfaction is weighted responsive to any or all of, but is not limited to, seniority, work status, age, or commuting distance.

In particular, in at least one embodiment, employee dissatisfaction is a weighted sum of the number of hours that an employee spends working outside the employee's preferred availability, the number of hours that the employee spends working outside the employee's preferred jobs, the number of hours that the employee spends working on the employee's preferred day off, and the difference between a number of scheduled hours and a number of preferred hours.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 10 is a table illustrating an exemplary assignment of shift identifiers to particular shifts.

DETAILED DESCRIPTION OF THE INVENTION

A preferred embodiment of the present invention schedules a group of employees for a number of jobs over some period, e.g., one week, in order to satisfy a set of workforce requirements for those jobs. The scheduler must not break any constraints involving employee availability, skills, weekly hours, daily hours, breaks and minor rules. In addition the scheduler must try to satisfy employee preferences as closely as possible in seniority order as defined by the user.

The dynamic scheduling algorithm of an embodiment of the present invention uses a heuristic algorithm known as "simulated annealing" to create a schedule that satisfies both labor requirements and employee preferences. This approach deals with the problem as a typical optimization problem, where an attempt is made to minimize some "objective function," subject to a set of constraints.

The solution is not necessarily the optimal solution, but it is usually very close to optimal. Finding the solution is an iterative process where it is never known how close the solution is to the true optimum.

One embodiment always gives the same solution under the same exact circumstances every time, by using a fixed random sequence, and a fixed number of iterations, specified by the user, and by controlling roundoff error at every step.

Figure 1:
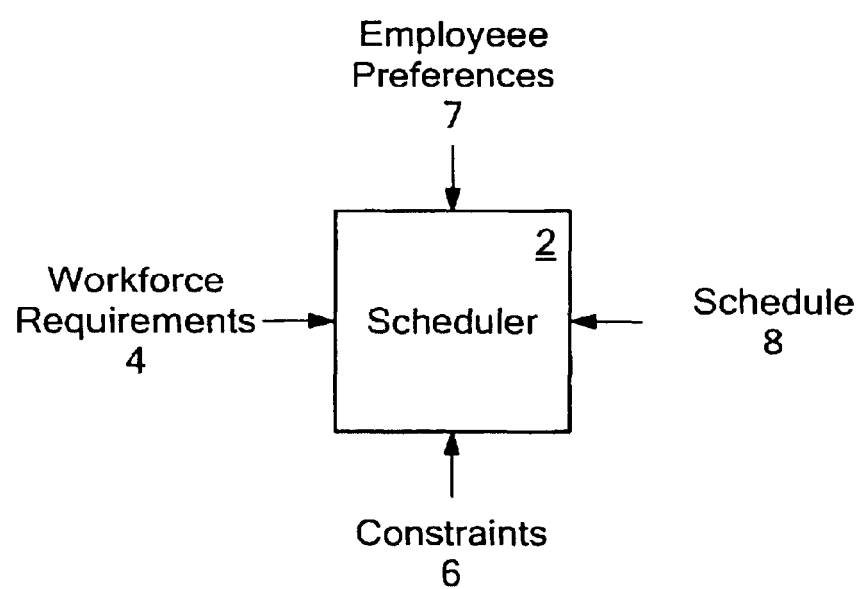
FIG. 1 is a block diagram of a scheduler embodiment.

FIG. 1 provides an overview of an embodiment of the present invention. Given a set of workforce requirements 4, produced, for example, by a forecasting program, a set of constraints 6, and employee preferences 7, a scheduler 2 produces a workforce schedule 8.

Figure 2:
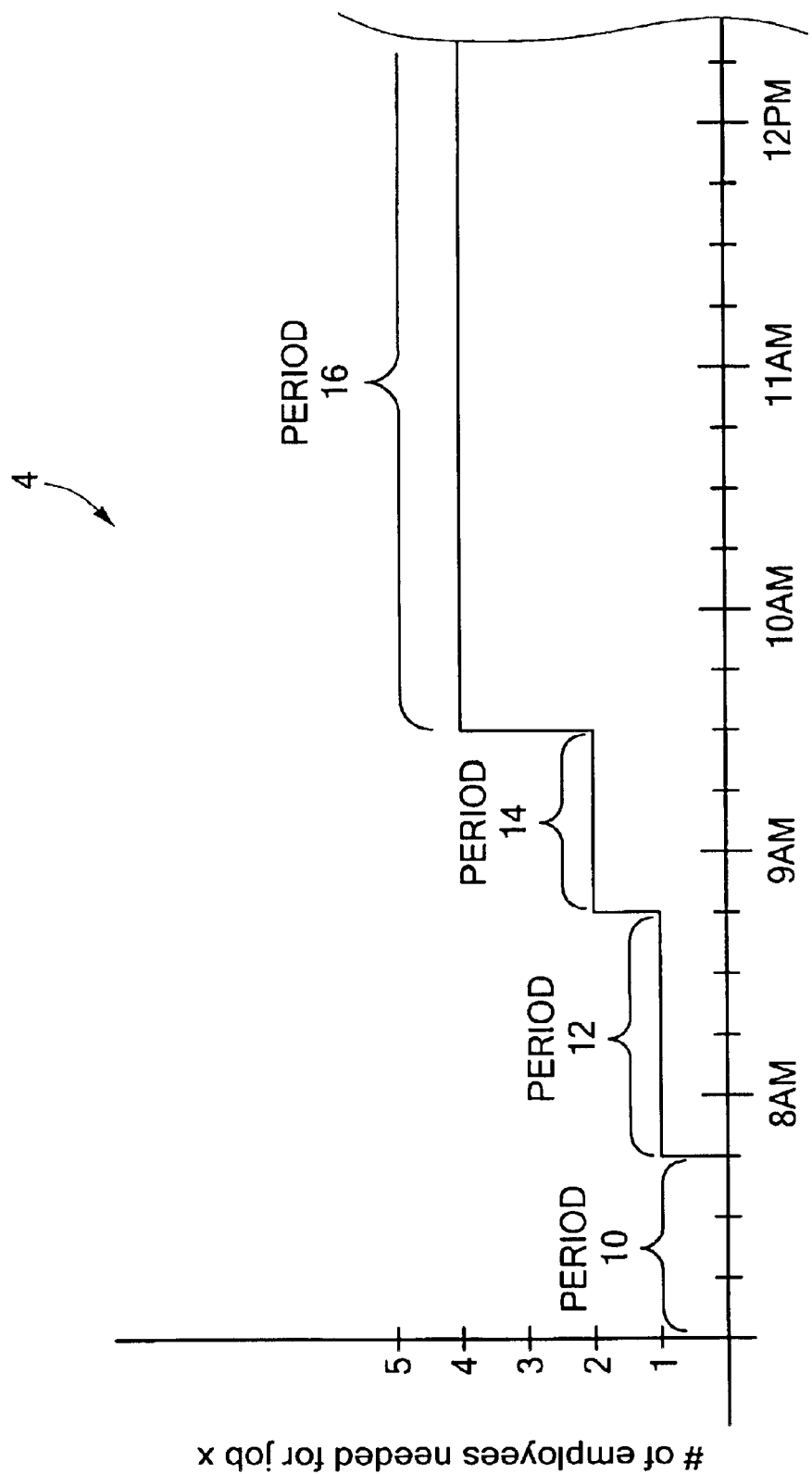
FIG. 2 is a graph of an exemplary workforce requirement for a particular job.

FIG. 2 illustrates a portion of an exemplary workforce requirement 4 for a single job, say a cashier, although it will be understood that each of a plurality of jobs has its own requirements. As seen in FIG. 2, on the particular day shown, no cashiers are needed before 7:45 am (Period 10). From 7:45 am until 8:45 am (Period 12), one cashier is needed. From 8:45 am until 9:30 am (Period 14), two cashiers are needed, and from 9:30 am until some later time (Period 16), four cashiers are needed.

Figure 3:
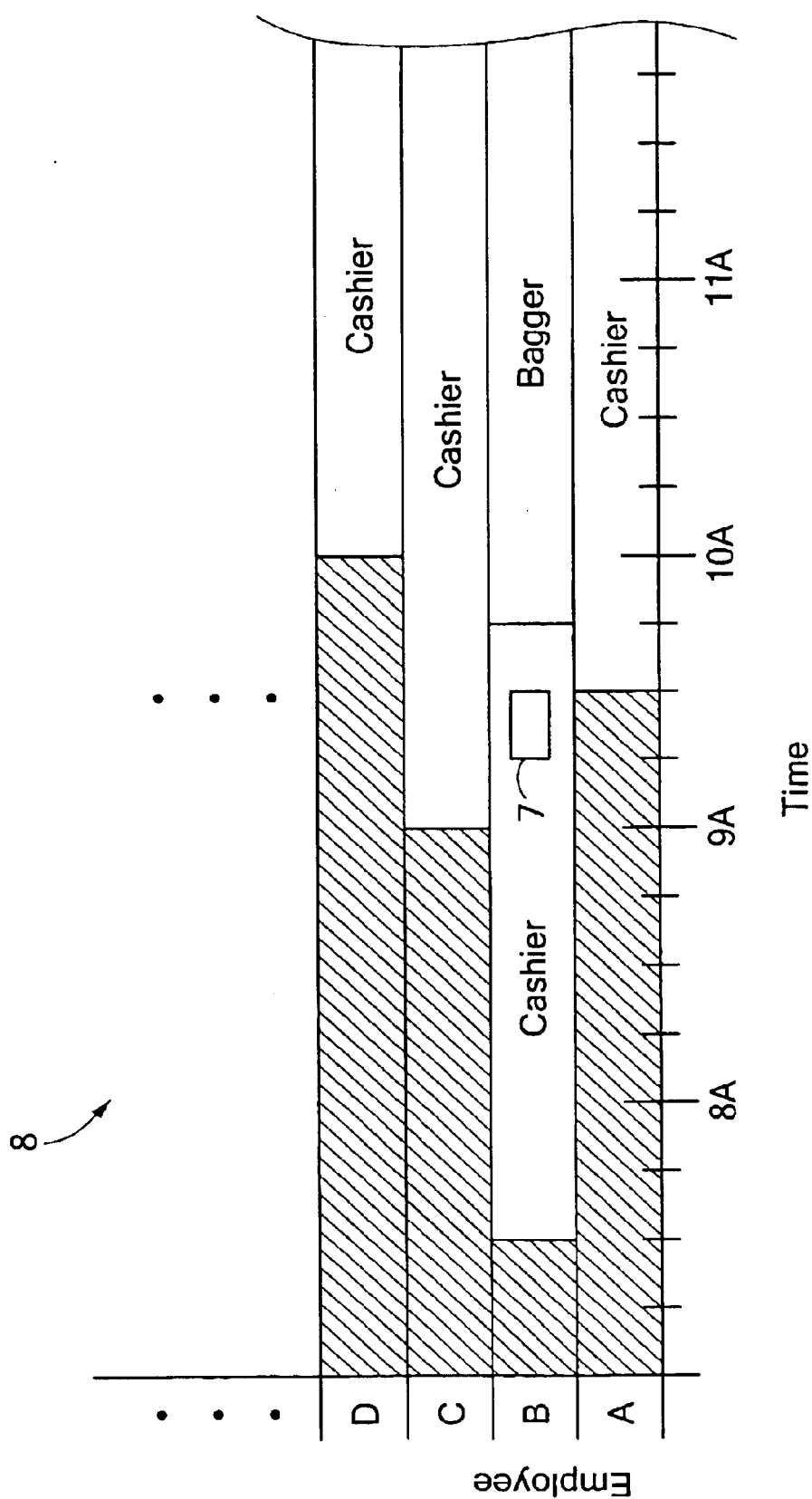
FIG. 3 is a graph of an exemplary workforce schedule produced by the present invention.

FIG. 3 illustrates an exemplary schedule 8 for employees A, B, C and D, as produced by the scheduler 2 of FIG. 1. Employee B is scheduled to work as a cashier from 7:30 am until 9:45 am, and as a bagger from 9:45 am until some later time. A 15-minute break 7 has also been scheduled for Employee B starting at 9:15 am. Similarly, Employees A, C and D have been scheduled to work as cashiers starting at 9:30 am, 9:00 am and 10:00 am respectively.

Figure 4A:
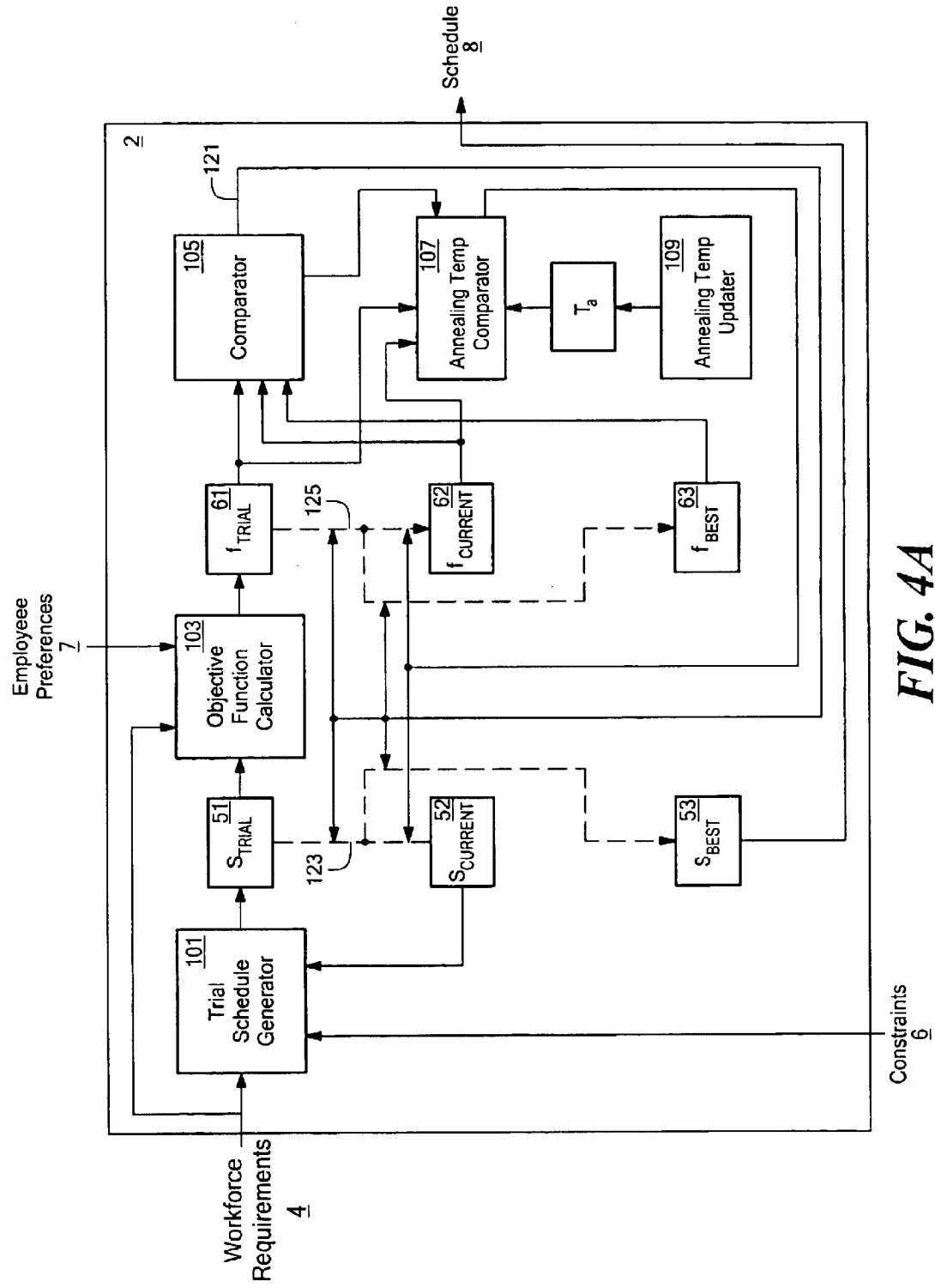
FIG. 4A is a schematic diagram of a particular embodiment of the present invention.
Figure 4B:
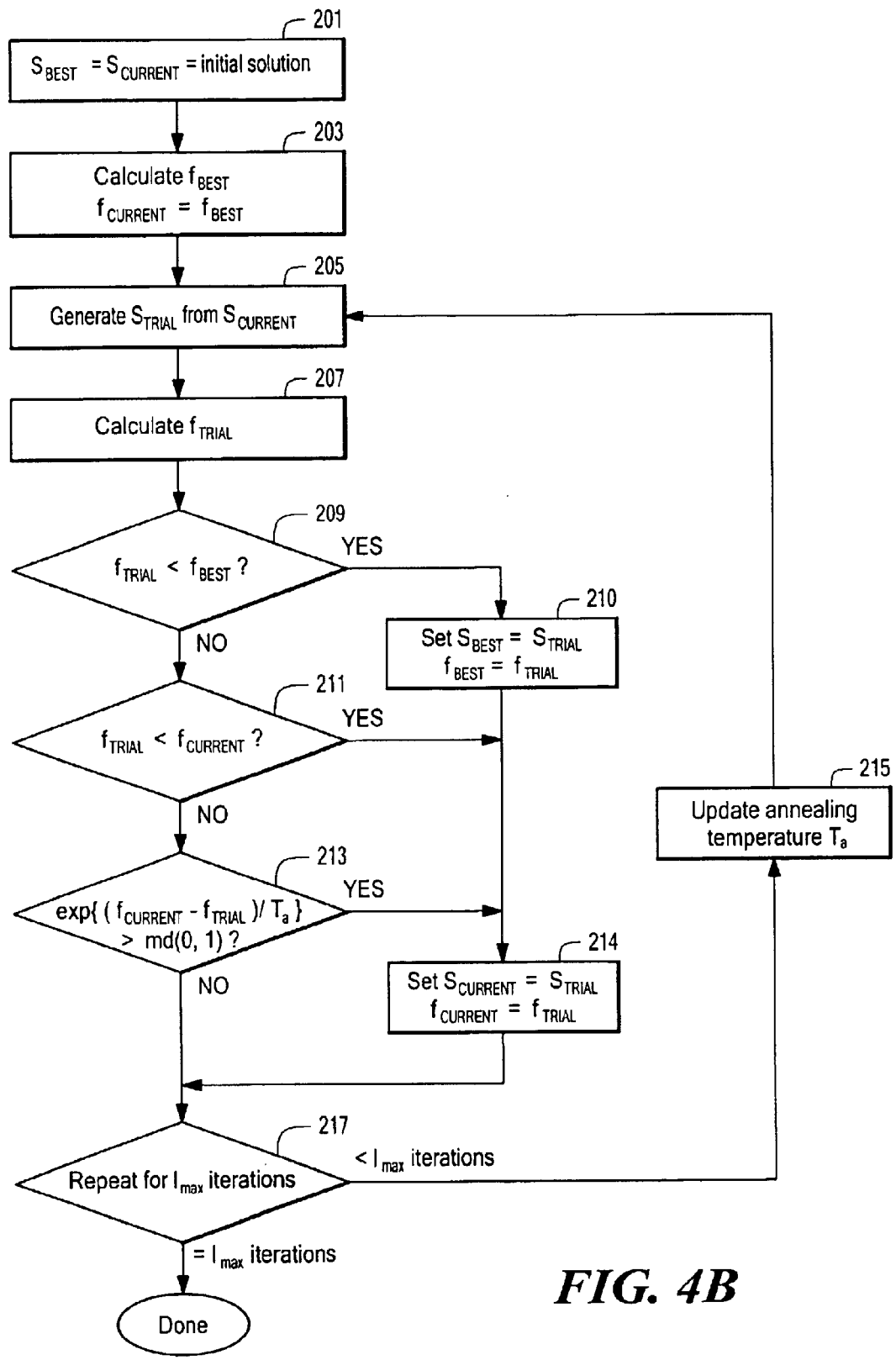
FIG. 4B is a flowchart of the process employed by an embodiment of the present invention.

FIG. 4A is a more detailed view of the embodiment of FIG. 1, while FIG. 4B is a flowchart of the corresponding process. Simulated annealing is a general trial and error approach used to find a solution to an optimization problem. During the process, three solutions to the problem are maintained: a trial solution $S_{trial}$ 51, a current or incumbent solution $S_{current}$ 52, and the best solution obtained so far $S_{best}$ 53.

First, the current solution $S_{current}$ 52 and $S_{best}$ 53 are set to some initial solution (Step 201), for example, an empty schedule. Then, a function f, called the "objective" function, and described in much greater detail below, is calculated for this initial solution and the value saved as $f_{current}$ 62 (Step 203) and as $f_{best}$ 63.

At Step 205, a trial schedule generator 101 generates a trial solution $S_{trial}$ 51 from $S_{current}$ 52 by modifying $S_{current}$ 52 using a heuristic which performs local optimizations At Step 207, an objective function calculator 103 calculates a value $f_{trial}$ 61 for the trial solution $S_{trial}$ 51 based in part on employee preferences 7.

At Step 209, a comparator 105 compares $f_{trial}$ 61 with $f_{best}$ 63. If $f_{trial}$ 61 is less than $f_{best}$ 63, that is, if $S_{trail}$ 51 is a better solution than $S_{best}$ 53, then at Steps 210 and 214, the comparator output 121 causes $S_{trial}$ 51 to be copied into both $S_{best}$ 53 and $S_{current}$ 52, as indicated by dashed lines 123. Similarly, the corresponding objective function value $f_{trial}$ 61 is copied into $f_{current}$ 62 and $f_{best}$ 63, as indicated by dashed lines 125.

If, at Step 209, it is determined that $f_{trial}$ 61 is not less than $f_{trial}$ 63, then at Step 211, comparator 105 compares $f_{trial}$ 61 with $f_{current}$ 62. If $f_{trial}$ 61 is less than $f_{current}$ 62, that is, $S_{trial}$ 51 is better than $S_{current}$ 52 but not as good as $S_{best}$ 53, then Step 214 is executed, and the comparator output 121 causes $S_{trial}$ 51 to be copied only to $S_{current}$ 52. Similarly, the corresponding objective function value $f_{trial}$ 61 is copied into $f_{current}$ 62.

Otherwise if $f_{trail}$ 61 is greater than $f_{current}$ 62, that is, $S_{trial}$ 51 is worse than $S_{current}$ 52, a decision is made at Step 213 by the annealing temperature comparator 107, which applies an "annealing function" to the current and trial values $f_{current}$ 62 and $f_{trial}$ 61 respectively, to determine whether to keep $S_{trial}$ 51. The reason for keeping $S_{trial}$ 51 is that ultimately, it could lead to a better solution.

The annealing function of a particular embodiment is $\exp((f_{current}-f_{trial})/T_a)$ where $T_a$ is the annealing temperature. This number starts out high and "cools down." At Step 213, the value of the annealing function is compared to a randomly generated number ranging from 0.0 to 1.0. If the annealing function is higher than this number, then $S_{trail}$ 51 is not discarded and is copied to $S_{current}$ 53 (Step 214), as controlled by the output 129 of the annealing temperature comparator 107.

At Step 217, the number of iterations executed thus far is compared with some predetermined threshold $I_{max}$. If $I_{max}$ iterations have executed, the process is complete, and the best solution so far determined, saved in $S_{current}$ 53 becomes the final schedule 8. If, on the other hand, $I_{max}$ iterations have not been executed, the annealing temperature $T_a$ is updated by the annealing temperature updater 109, and the process repeats from step 205.

A defining aspect of the simulated annealing approach is that it explores solutions that would be rejected by other algorithms and it does not get trapped in a local minimum. The annealing function prevents the process from spending too much time looking at bad solutions, especially towards the end of the process as the annealing temperature cools down.

Generating an initial solution (part of Step 201) presents a problem if the initial solution must be a strictly "feasible" solution, that is, a solution that satisfies all constraints. For example, the simplest initial solution is to generate an empty schedule in which no employees are schedule to work. However, this solution is infeasible because it breaks a Minimum-Hours-Per-Week constraint.

Fortunately, this problem can be ignored in Step 201 because Step 205 ensures that any solution is a feasible solution. Since no evaluations are performed until Step 207, a feasible solution is not required in Step 201. In order to handle this situation correctly however, an artificial cost is added to the objective function f for breaking the Minimum-Hours-Per-Week constraint, as discussed below.

The Objective Function

The objective function calculator 103 of FIG. 4A calculates, for a given set of workforce requirements and a trial schedule $S_{trial}$ 51, the value of an objective function.

Figure 5:
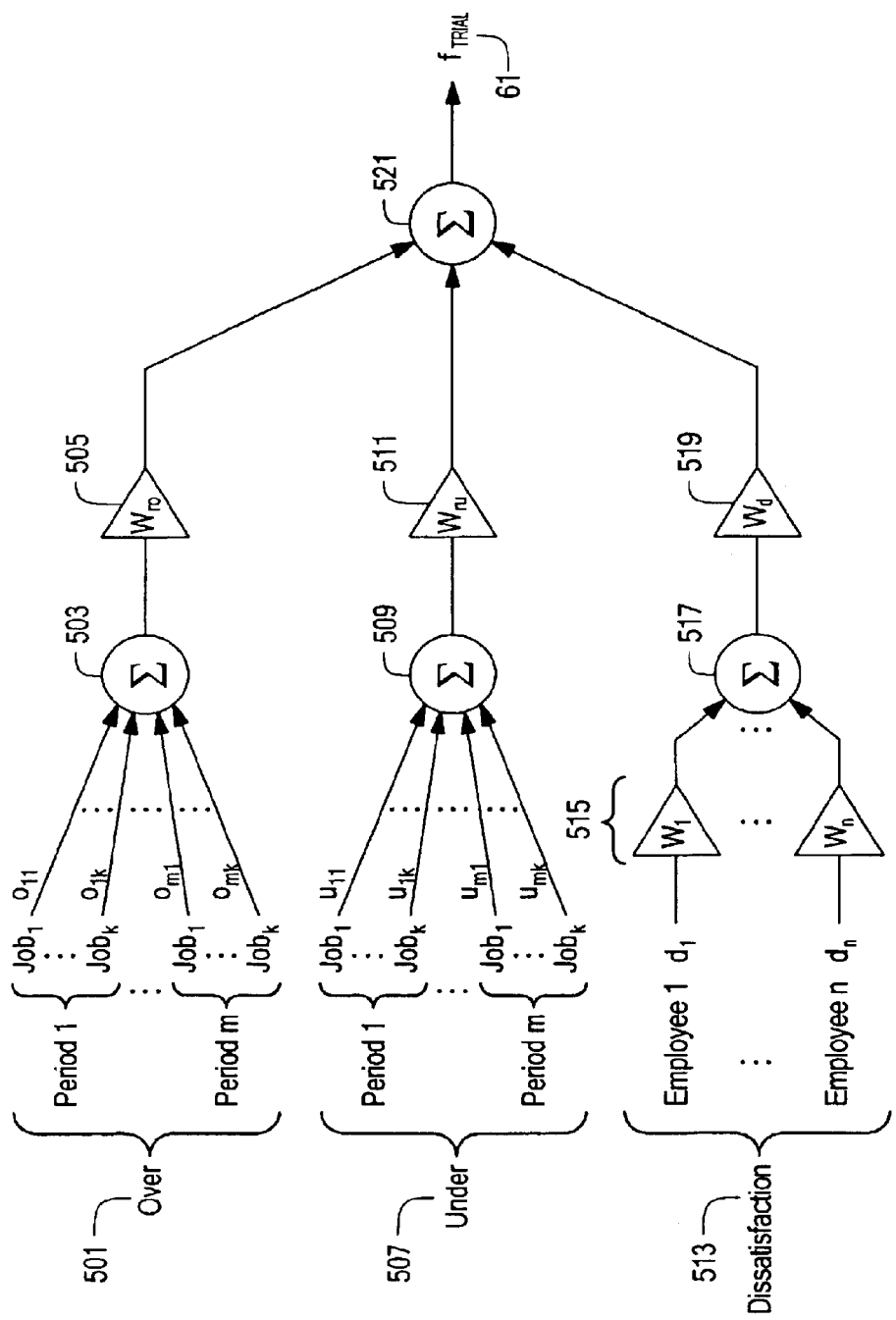
FIG. 5 is a schematic diagram illustrating the calculation of the objective function $f_{trial}$ as performed by the objective function calculator of FIG. 4A.

FIG. 5 illustrates a preferred objective function, which expresses the goals of satisfying both labor requirements and employee preferences:

$$f = W_{ro}\Sigma\Sigma o_{ij} + W_{ru}\Sigma\Sigma u_{ij} + W_d \Sigma W_k d_k \qquad (Eq. 1)$$

Here, f is the cost, or objective, function to be minimized, and is the output of the objective function calculator 103, corresponding to $f_{trial}$ 61 (FIG. 4A).

Assuming for the sake of discussion that 15-minute intervals are used, $\Sigma\Sigma o_{ij}$ is the total number of overscheduled minutes 501 for all 15-minute periods i and all jobs j, calculated by the summation 503, that is, for i=1 to 672 (where there are 672 15-minute intervals in a week), and for j=1 to $N_{jobs}$, where $N_{jobs}$ is the total number of jobs. Of course, periods other than one week and intervals other than 15-minute intervals can also be used. $W_{ro}$ 505 is a weighting factor or penalty factor associated with overscheduling any job during any period.

$\Sigma\Sigma u_{ij}$ is the total number of underscheduled minutes 507 for all 15 minute periods i and all jobs j, that is for i=1 to 672 and for j=1 to $N_{jobs}$, and is calculated by the summation 509. $W_{ru}$ 511 is a weighting factor or penalty factor associated with underscheduling any job during any period.

$\Sigma w_k d_k$ is the sum of dissatisfaction $d_k$ 513 of each employee k weighted by $w_k$ 515 for k=1 to $N_{employees}$ where $w_k$ reflects seniority, work status, etc., and is calculated by the summation 517. $W_d$ 519 is an overall weighting of total employee dissatisfaction.

Summation 521 adds the weighted overs, unders and dissatisfaction to produce the resulting $f_{trial}$ 61.

Figure 6:
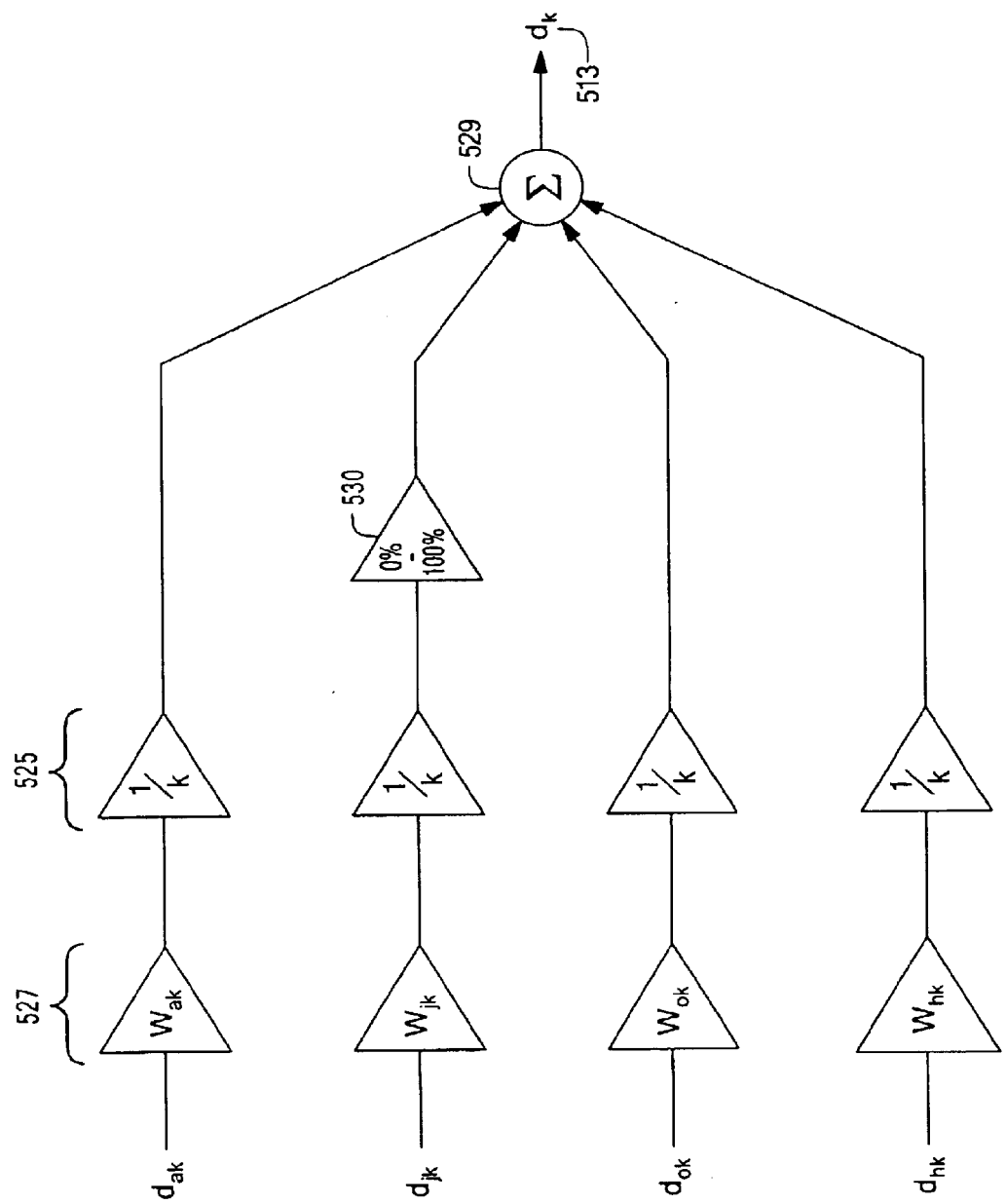
FIG. 6 is a schematic diagram illustrating the derivation of individual employee dissatisfaction, as used in FIG. 5.

FIG. 6 shows a preferred embodiment in which four factors contribute to a determination of employee dissatisfaction $d_k$:

$$d_k = w_{ak}d_{ak} + w_{jk}d_{jk} + w_{ok}d_{ok} + w_{hk}d_{hk} \quad \text{(Eq. 2)}$$

where:

$d_{ak}$ is the number of hours that employee k spends working outside his preferred availability;

$d_{jk}$ is the number of hours that employee k spends working outside his preferred jobs;

$d_{ok}$ is the number of hours that employee k spends working on his preferred day off; and $d_{hk}$ is the difference between an employee's preferred number of hours and the number of hours actually scheduled for the employee, that is, $d_{hk}$=abs (scheduled−preferred) hours for the week for employee k.

$w_{ak}, w_{jk}, w_{ok}$ and $w_{hk}$ are weighting factors 527 for preferred availability, preferred job, preferred days off, and preferred hours per week for employee k, respectively. Summation 529 adds the weighted dissatisfaction costs to produce a total dissatisfaction cost $d_k$ for employee k.

Note that weighting factors for the labor requirements could be assigned for each individual job or for each period of the day. For example, different jobs could have different associated weighting factors for overs and unders. Finally, certain periods of the week could be favored over others by varying the distribution of the weights, that is, by assigning different weighting factors to different periods.

Looking again at FIG. 5, in order to deal with the three main weighting factors, i.e., $W_{ro}$ 505, $W_{ru}$ 511 and $W_d$ 519, assume for discussion that overscheduled intervals ("overs") are just as undesirable as underscheduled intervals ("unders"), i.e., $W_{ro}=W_{ru}$. Looking at the objective function of Eq. (1), it is obvious that all three factors can be arbitrarily scaled by the same number without affecting the solution. Since dissatisfaction is preferably in terms of hours, while overs and unders are in minutes, let $W_{ro}=W_{ru}=\frac{1}{60}$. This normalizes Eq. (1) so that $W_d$ now represents a ratio $R_d$ of the relative importance of employee satisfaction to satisfying work requirements.

This ratio can be assigned by the user. Thus, $W_d=R_d$ is a user-configurable ratio from 0.0 to 1.0, where $R_d$=0.0 means employee satisfaction has no importance, and $R_d$=1.0 means employee satisfaction is roughly as important as workforce requirements.

The dissatisfaction weighting factors $w_{ak}, w_{jk}, w_{ok}, w_{hk}$ 527 can be assigned by a user in several ways.

These weighting factors still do not take into account preference by seniority scheduling. To accomplish this, the user can configure the seniority order and an additional weighting factor is applied to each employee that reflects his position in the order. In one embodiment, this weighting factor is simply 1/k for the k'th employee.

In other words, for employee k, $w_{ak}=w_a/k$ $w_{jk}=w_j/k$ $w_{ok}=w_o/k$ $w_{hk}=w_h/k$ The 1/k factor strongly favors employee satisfaction at the high end. Alternate schemes can be used that are not so top heavy. However, the user can always turn off this progression completely for one or more work statuses. This forces all employees in a work status to have the same dissatisfaction weighting factors.

The 1/k factor also tends to weaken the overall employee satisfaction component of the objective function. To account for this, $W_d$ can be further scaled by the following factor:

$$f_d = n \bigg/ \left( \sum_{i=1}^{n} 1/i \right)$$

where n is the number of employees, so that now, $W_d = f_d * R_d$ where $R_d$ is the user configured ratio ranging from 0.0 to 1.0.

Preferably, there is one additional consideration in calculating the dissatisfaction for non-preferred jobs $w_{jk}*d_{jk}$. That is, $d_{jk}$ is not exactly the number of minutes worked outside of the employees preferred job. This is because jobs are not simply configured as preferred or non-preferred. Instead, jobs are ranked or scaled by a factor which ranges from 0 to 100, 0 for a job that is completely dissatisfying and 100 for a job that is completely satisfying. Thus, if an employee ranks a job as 50 and works 10 hours in that job and spends the rest of the week working in jobs that are rated 100 then the $d_{jk}$=10*50%=5 hours.

Other factors may also be used to adjust the weight, such as seniority, work status, age and/or commuting distance.

Constraints

There are several different types of constraints that a solution must satisfy. For example, availability constraints, i.e. times during the week that an employee can work, include all availability periods as specified in the base cycle, base override, personal cycle and personal override configurations for each employee. Every employee that is to be scheduled for the week can be thought of as having a set of availability periods for that week.

Skill constraints comprise, for example, the set of jobs that an employee can work, or is capable of working.

Hours rules constraints include maximum and minimum shift length, preferably not including breaks; maximum hours and maximum overtime (OT) hours per day; minimum time between shifts, etc.

Minor rule constraints, that is, rules pertaining to minors, are, generally, overrides to availability and hours rulesets.

Other constraints include meal/break rules for each employee, Shift Transition Time which are short periods of time that may occur at the beginning or end of a shift to allow an employee to prepare for the beginning or end of a shift, and Rounding rules which allow a user to specify values for rounding a resulting schedule, for example, shifts limited to multiples of 1 hour, 30 minute or 15 minute periods, or paid and unpaid breaks limited to multiples of 1 hour, 30 minute, 20 minute, 15 minute, 10 minute or 5 minute periods.

Trial Schedule Generation

Figure 7:
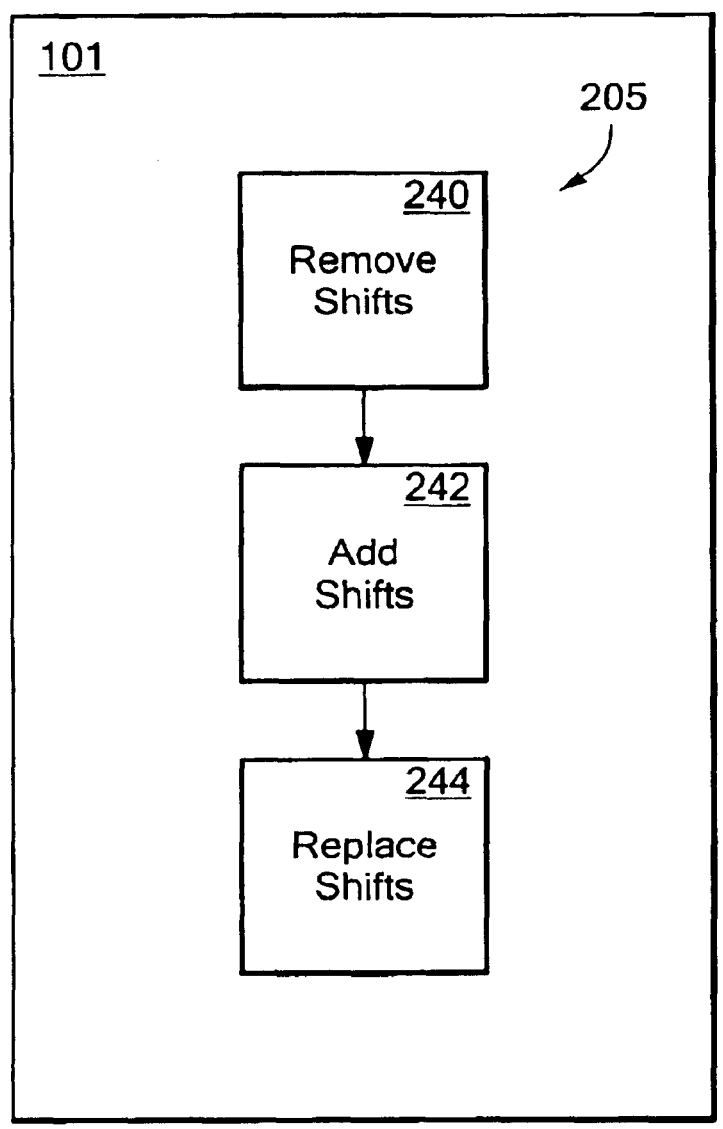
FIG. 7 is a schematic diagram of the trial schedule generator of FIG. 4A.

The purpose of the heuristic used by the trial schedule generator 101 is to generate a new trial solution $S_{trial}$ that is better than the current solution $S_{current}$. As FIG. 7 illustrates, this is done in a three-step process, performed by the trial schedule generator 101 of FIG. 4A and corresponding to Step 205 of FIG. 4B First, at Step 240, the highest cost shifts, i.e., shifts that increase the overall value of the objective function, are removed. These are replaced by adding, at Step 242, low cost shifts, i.e. shifts that reduce the overall value of the objective function the most or increase it the least. Finally, at Step 244, the algorithm attempts to find replacement shifts for each and every shift in the trial schedule.

The Remove Shifts step 240 attempts to remove some of the most costly shifts. It removes these one at a time in a loop that first searches for the topmost cost-reducing shifts and then picks one of these at random for removal. The randomness introduced as part of the simulated annealing approach prevents the algorithm from getting stuck in a local optimum. After some fraction of the shifts are removed, this procedure stops. If it were allowed to continue indefinitely, removal would no longer be cost reducing.

Figure 8:
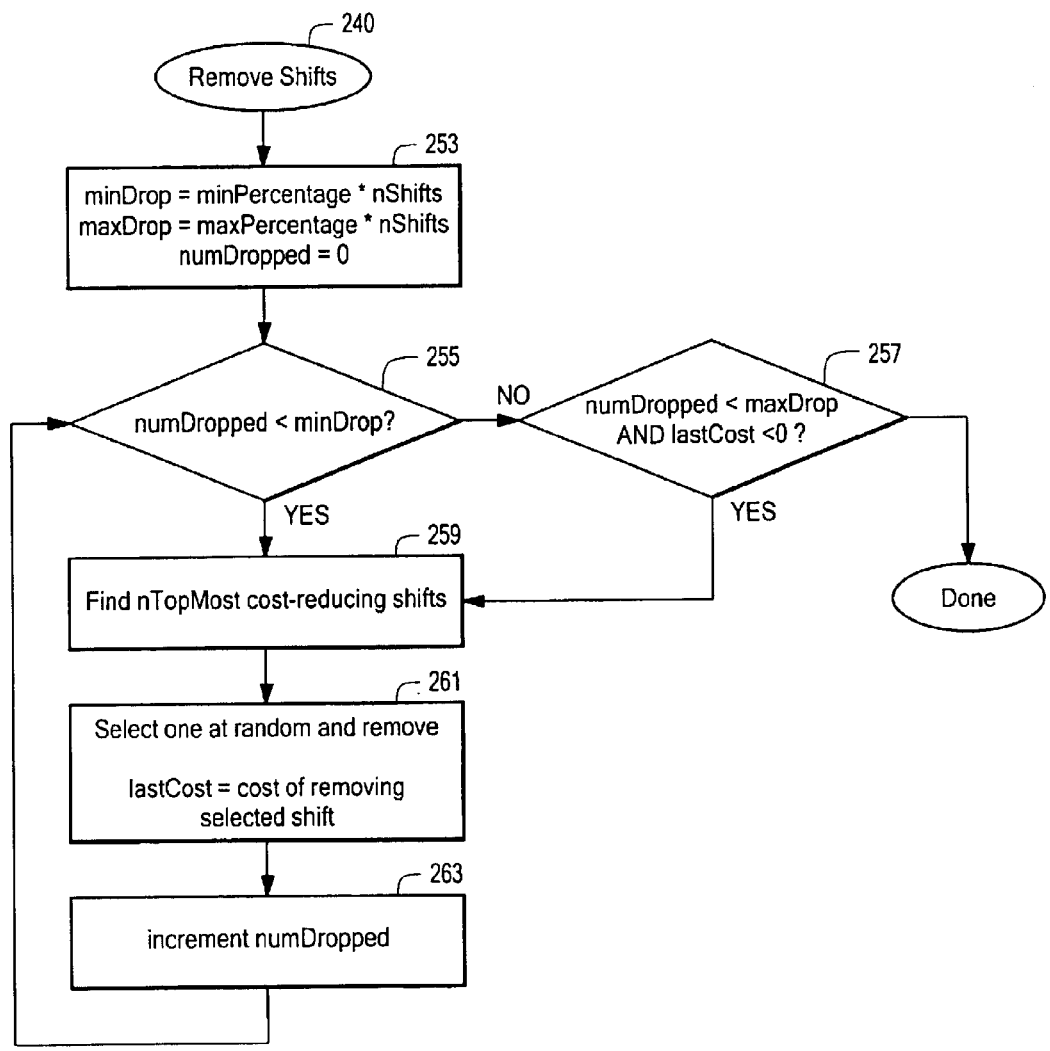
FIG. 8 is a flowchart of the Remove Shifts step of FIG. 7.

FIG. 8 is a flowchart of an embodiment the Remove Shifts step 240 of FIG. 4B. A minimum number (minDrop) of shifts is dropped, after which additional shifts are dropped until either dropping shifts no longer lowers the cost function value or a maximum number (maxDrop) of shifts have been dropped.

In Step 253, minDrop is set to some minimum percentage of nShifts, the number of shifts currently scheduled, and maxDrop is set to some maximum percentage of nShifts, so that minDrop and maxDrop form lower and upper limits respectively to the number of iterations to be executed. The number of shifts dropped or removed so far, numDropped, is initialized to zero.

If minDrop iterations have not yet occurred, i.e., numDropped<minDrop (Step 255), or if maxDrop iterations have not yet occurred and lastCost<0, i.e., (numDropped<maxDrop) AND (lastCost<0) (Step 257), then a shift is removed, beginning with Step 259. Otherwise the Remove Shifts process 240 is complete.

At Step 259, the n most cost-reducing shifts are found, for some number n, for example, by selecting each shift one at a time and recalculating the objective function as if that shift were removed. At Step 261, one of the n cost-reducing shifts found in Step 259 is randomly selected and removed. The cost of dropping the removed shift, that is, the difference between the cost function values with and without the shift, is determined as the value lastCost. Finally, at Step 263, numDropped is incremented to indicate the completion of another iteration.

Note that it may be necessary to break the Minimum Hours Per Week constraint in order to remove the maxPercentage of the shifts. For this reason, a new component is added to the dissatisfaction cost, discussed below. This cost is proportional to the number of hours below the Minimum Hours Per Week that the employee is scheduled. This is usually a strong enough factor to naturally drive the solution back to a feasible state during the Add Shifts step 242. However if the solution is still not feasible after the Add Shifts phase, it is forced to be feasible by adding additional shifts in the Replace Phase. In any event, at the end of Step 205 of FIG. 4B, a feasible solution exists that can be evaluated.

The Add Shifts step 242 (FIG. 7) is naturally the most complex aspect of the algorithm. It is, after all, creating the schedule. It is responsible for generating low cost shifts that satisfy all constraints. Before a discussion of this step, however, it is important to understand three important objects that Add Shifts depends on. These are a Scheduled Employee List, a Shift Lookup Table, and Period Totals.

Figure 9:
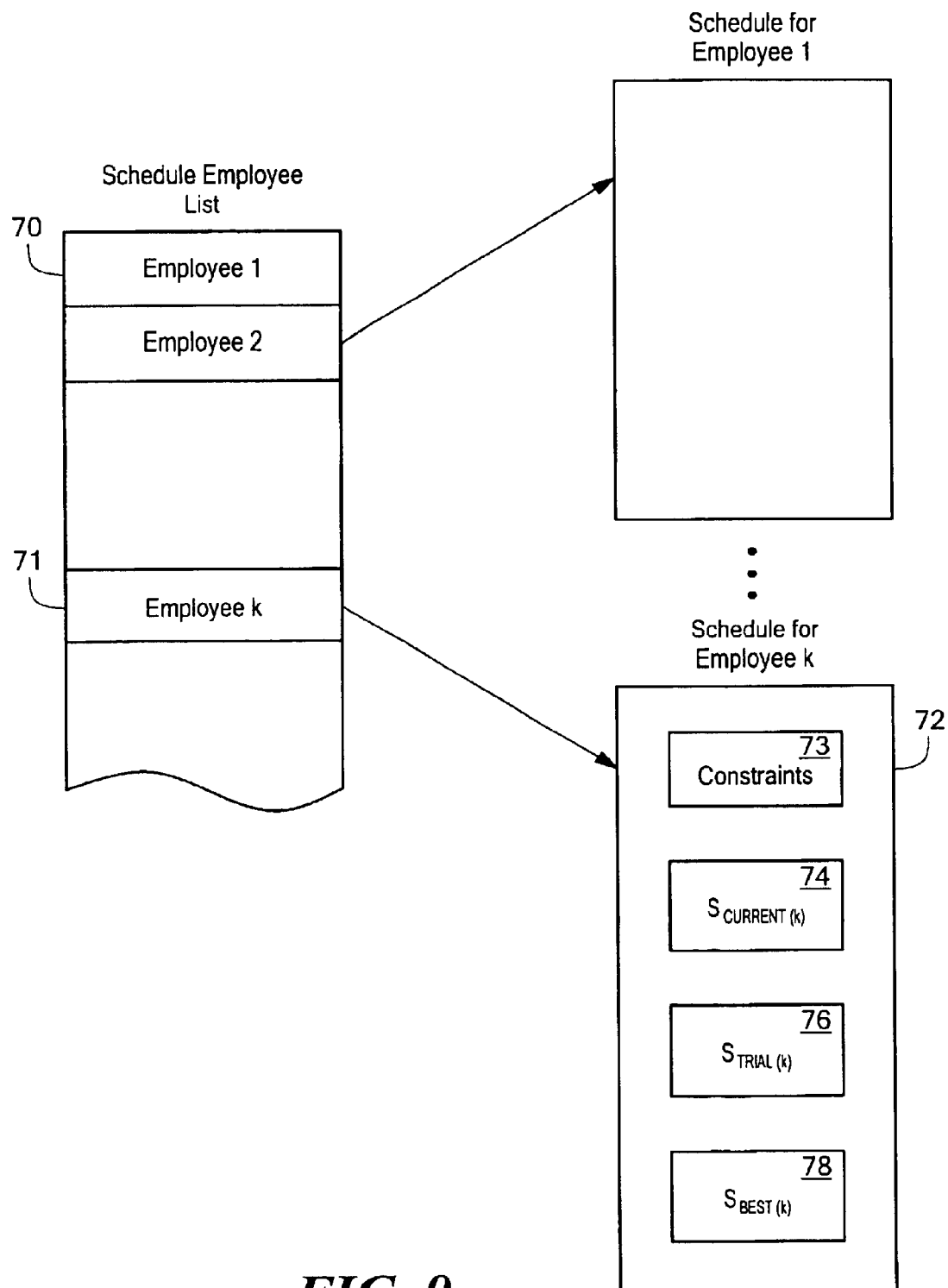
FIG. 9 is a block diagram illustrating the ScheduleEmployeeList and a ScheduleEmployee object of the present invention.

FIG. 9 illustrates a Schedule Employee List 70, which is a list of Schedule Employee objects. For example, row 71 of the Schedule Employee List 70 references a Schedule Employee object 72 for Employee k.

Each Schedule Employee object 72 maintains all of the constraints and preferences 73, e.g., availability, minimum and maximum hours, shift lengths and dissatisfaction weighting factors, etc. for an individual employee. From the scheduler's point of view, each employee has his own individual constraints and preferences, even though they may be derived from a common ruleset or base schedule.

Each Schedule Employee object 72 maintains a copy of the current schedule 74, the trial schedule 76 and the best schedule 78 for each employee.

FIG. 10 illustrates the first step in creating a shift lookup table. The shift lookup table allows the scheduler to express availability, skill set and shift length constraints very efficiently so that only shifts that satisfy these constraints are created. It also provides an efficient way to quickly determine which employees can work a specific shift.

First, a list 80 of all possible shifts that could be scheduled is generated. This list can be generated, for example, by determining every possible unique combination of start time, duration and job. Each combination can be mapped, for example, to a unique 32-bit integer shift identifier 81. The result is a set of unique shift IDs from 0 to S−1 (for S shifts) that describe every possible shift that can be worked, and that are used to reference the shift lookup table.

A shift is characterized by its start time 85, length 87 and job 89. If a shift can start on any 15-minute period within one week, then there are 672 possible start times. Of course, other periods such as ½ hour or 1 hour can be used, in which case the number of possible start times is only 336 or 168 respectively.

The number of possible shift lengths is much more limited. For a 2 hr minimum and 8 hour maximum, using 15-minute intervals, there are only 25 possibilities. The number of possible jobs is nearly always less than 100 and more likely less than 20.

In a worst case scenario using 15-minute intervals with 100 jobs to schedule, there are 672*25*100=1,680,000 possibilities. This a very large number but not unmanageable. A more realistic case using 30-minute intervals and 20 jobs to schedule leaves only 87,360 possibilities.

Each of these shifts can be assigned a unique identifier 81 which references a row of the shift lookup table. The trial shift generator 101 can quickly obtain information about a particular shift, such as the feasibility of a shift or which people are available to work the shift, by using this index to reference the shift lookup table.

The shift lookup table is an array of pointers indexed by a shift identifier 81. Each pointer points to a bitmap region that indicates which employees can work the associated shift. If no one can work the shift, then the pointer is null. In addition to the employee bitmap, each region keeps a total count of how many employees can work the shifts. Using this approach many, of the pointers will point to the same region, thereby conserving memory.

Figure 11:
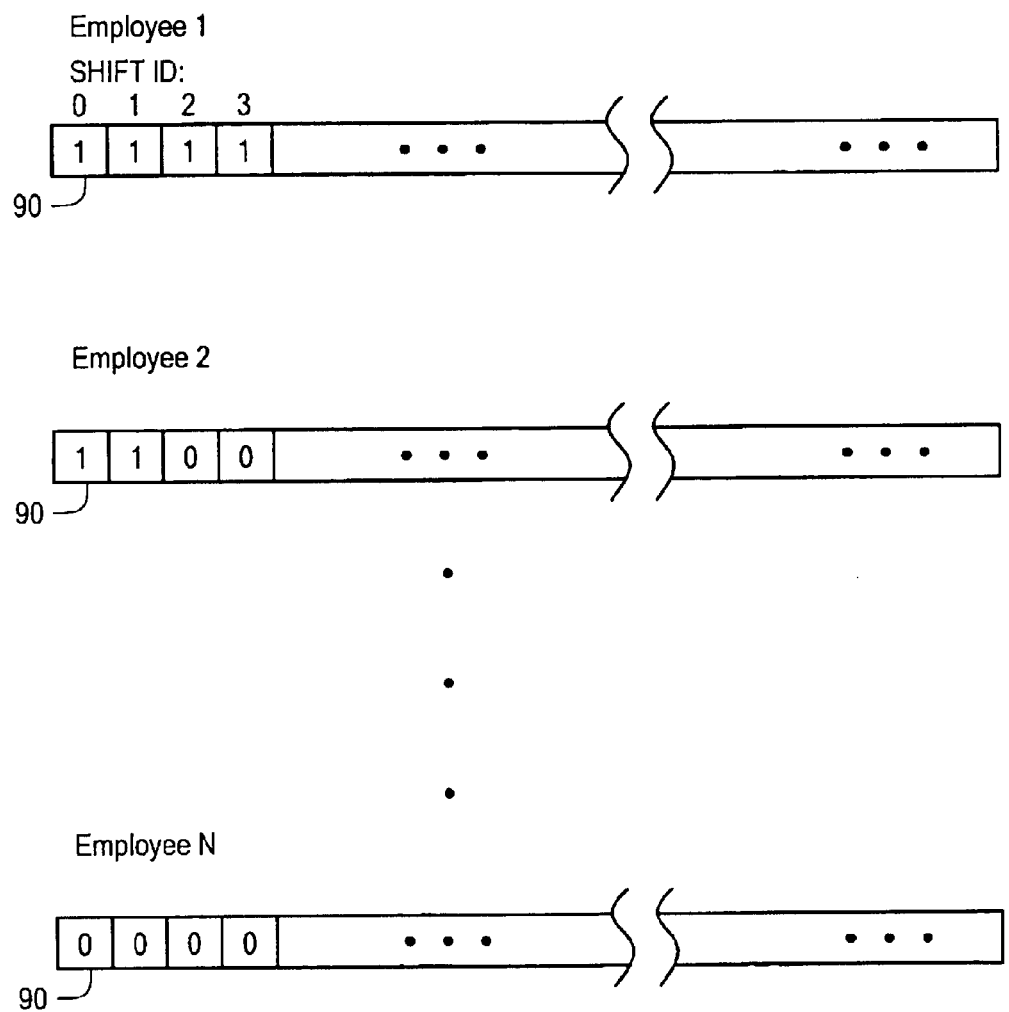
FIG. 11 is a schematic diagram illustrating bitmaps which match employees to shifts for which the employees are available.

FIG. 11 illustrates how in one embodiment, to create a shift lookup table, a temporary bitmap 90 is first created for each employee. Each bitmap 90 represents every possible shift that the corresponding employee can work. This can be done, for example, by scanning each employee's availability periods and minimum and maximum shift length in the employee's associated Schedule Employee object 72 (FIG. 9), and then setting the corresponding bit in the shift lookup table.

For example, Employee 1 is available to work shifts identified by identifers 0, 1, 2 and 3. Employee 2 is available to work shifts identified by identifiers 0 and 1, but not shifts 2 or 3. Similarly, Employee N is not available to work any of shifts 0–3.

For a large number of employees, for example, 1000, this can be an unreasonable and impractical amount of data, consuming on the order of 20 Mb. This large amount of data can be greatly condensed by taking advantage of the fact that a large number employees will always have a significant amount of overlap between the shifts that they can work.

Thus, in a particular embodiment, shifts can be grouped into "regions" that are characterized by a common set of employees that can work that shift. Every shift belongs to one and only one region and many shifts will belong to a common region. A region is characterized by a bit map where each employee is represented by one bit. For example, 125 bytes are required to represent 1000 employees.

The present invention takes advantage of the fact that many employees can work a common set of shifts. The larger the number of employees, the truer this is. Shifts can be grouped into "regions" that are characterized by a common set of employees who can work those shifts.

Every shift belongs to one and only one region. But an employee can belong to many regions. Therefore, the set of shifts can be represented as a simple, single dimensional array from 0 to S−1, where each element points to a region. The region reveals every possible employee that can work that shift.

Each region can be represented by a bit map that is N/8 bytes long for N employees. Depending on how much overlap there is, and there is typically quite a bit, not all that many regions are needed. The worst case is N regions, but his would be extremely unlikely in a real life situation with many employees. For example, for a set of 100 very diverse employees, a typical number of regions is between 20 and 30. The ratio improves greatly as N gets larger. For example, for 1,0000 employees, the number of regions will likely be less than 100.

Figure 12:
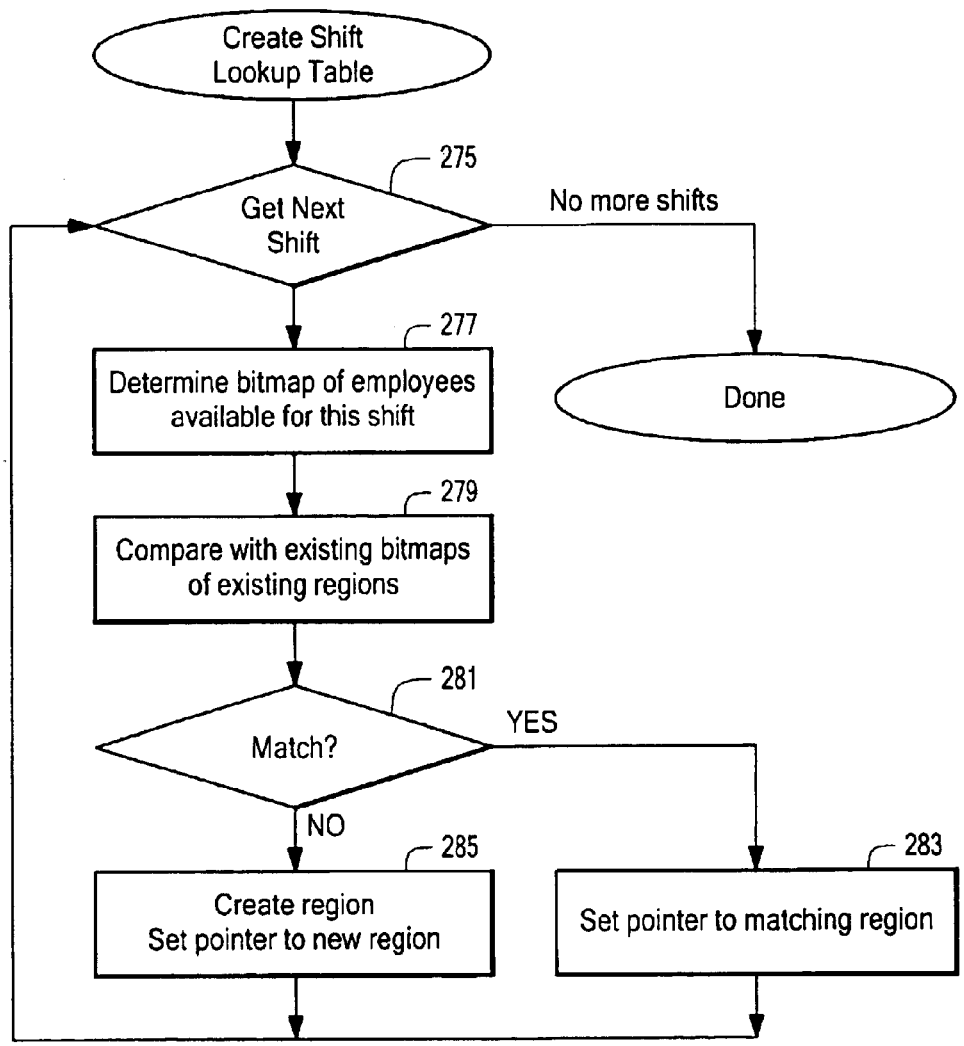
FIG. 12 is a flowchart illustrating the creation of a Shift Lookup Table.

FIG. 12 is a flowchart demonstrating how the shift lookup table is created. At Step 275, a shift which has not yet been mapped is selected. If there are no more unmapped shifts, the process is done.

Otherwise, at Step 277, a bitmap 90 (FIG. 11) is determined for the selected shift, indicating which employees are available to work that shift. The resulting bitmap is compared against existing bitmaps of existing regions in Step 279. If there is a match, as determined in Step 281, then in Step 283, a pointer to the region is associated with the shift, by storing the pointer in the row of the shift lookup table indexed by the shift's identifier. If no match was found in Step 281, then at Step 285, a new region is created and a pointer to the new region is stored, or associated, with the shift.

The scheduler generates each shift/employee combination one at a time until the requirements are satisfied, and then repeatedly takes shifts away from employees and reassigns completely new shift/employee combinations until it comes up with the best solution it can find in some predetermined number of iterations. In order to do this, the scheduler must be able to generate candidate lists of shift-employee combinations very quickly. The shift lookup table enables this speedy generation.

Figure 13:
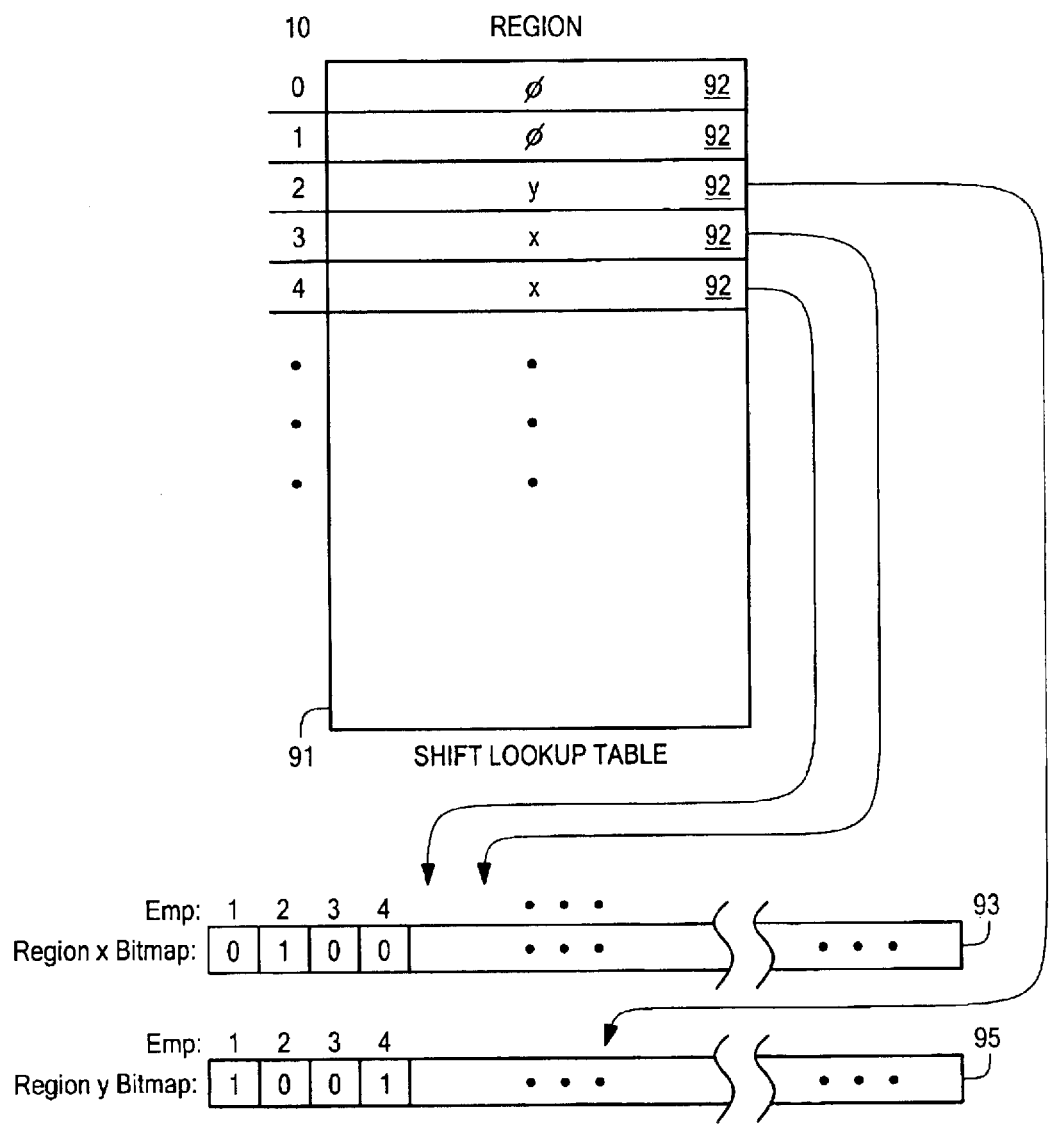
FIG. 13 is a schematic diagram of a Shift Lookup Table.

FIG. 13 illustrates a particular embodiment of a shift lookup table 91. Each entry 92 in the table corresponds to a particular shift, and is referenced by the identifier for that shift. Furthermore, each entry 92 contains a pointer to a region. For example, shifts 3 and 4 each contain a reference to Region X 93 while shift 2 contains a reference to Region Y 95.

It can be seen that, for example, Employee 2 is available to work any shift belonging to Region X 93, including shifts 3 and 4. Similarly, Employees 1 and 4 are available to work any shift belonging to Region Y 95, including shift 2. Thus, by using the Shift Lookup Table 91, it is possible to determine, given a shift identifier, which employees are available to work the associated shift, without the necessity of maintaining a separate bitmap for each shift.

For each and every period of the week, regardless of whether periods are measure in 15-minute intervals, 30-minute intervals or some other interval, various key totals are tracked for each job. Thus, for each type of total, there is actually an array of size nJobs×nPeriods, where nPeriods is the number of periods in the week.

For example, Required[i, j] is the total workforce requirement, in minutes, for period i and job j.

Similarly, BestScheduled[i, j] is the total number of minutes scheduled for the best solution, CurrScheduled[i, j] is the total number of minutes scheduled for the current solution, and TrialScheduled[i, j] is the total number of minutes scheduled for the trial solution.

Availability[i, j] is the total number of available minutes, i.e., the number of minutes in the period times the number of available employees.

FillDifficulty[i, j] is a measure of the difficulty of filling a particular slot, and is calculated as (Required[i, j]−TrialScheduled[i, j])/Availability[i, j].

The Add Shifts step 242 (FIG. 7) schedules shifts that reduce the cost of underscheduled periods ("unders") by finding the "area" that needs the most coverage. An area is defined by a job, a start slot and an end slot. An attempt is then made to find the most cost-reducing shift to schedule in this area. This process is repeated until no more low-coverage areas can be found. If no shift can be found for an area, that area is marked as unfillable and ignored during the search for new areas. The unfillable status is cleared at the end of the Add Shifts routine so that these areas can be explored again later.

Figure 14:
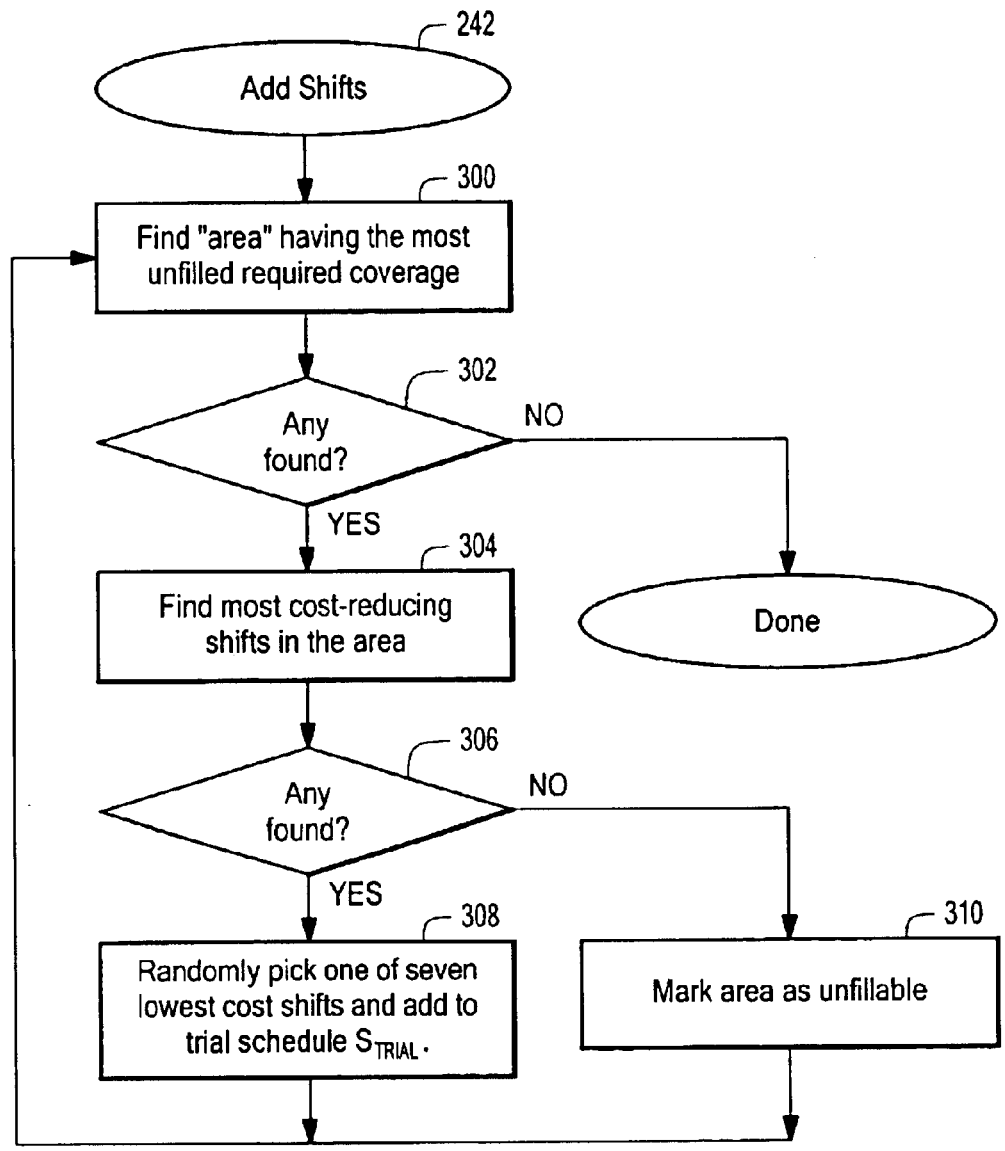
FIG. 14 a flowchart of the Add Shifts step of FIG. 7.

FIG. 14 is a flowchart of the Add Shifts step 242 of FIG. 7. At Step 300, the area having the most unfilled required coverage is determined. This is described in more detail below with respect to FIG. 15. At Step 302, if no area is found, the process is complete. If, however, an area is found, then at Step 304, the most cost-reducing shifts in the area are determined. Step 304 is described in more detail below with respect to FIG. 16.

If, at Step 306, no cost-reducing shifts are found, the area is marked as unfillable at Step 310. On the other hand, if cost-reducing shifts are found, then at Step 308, one of the seven lowest-cost shifts is randomly selected and added to the trial schedule $S_{trail}$.

This process repeats until no more areas are found in Step 302.

Figure 15:
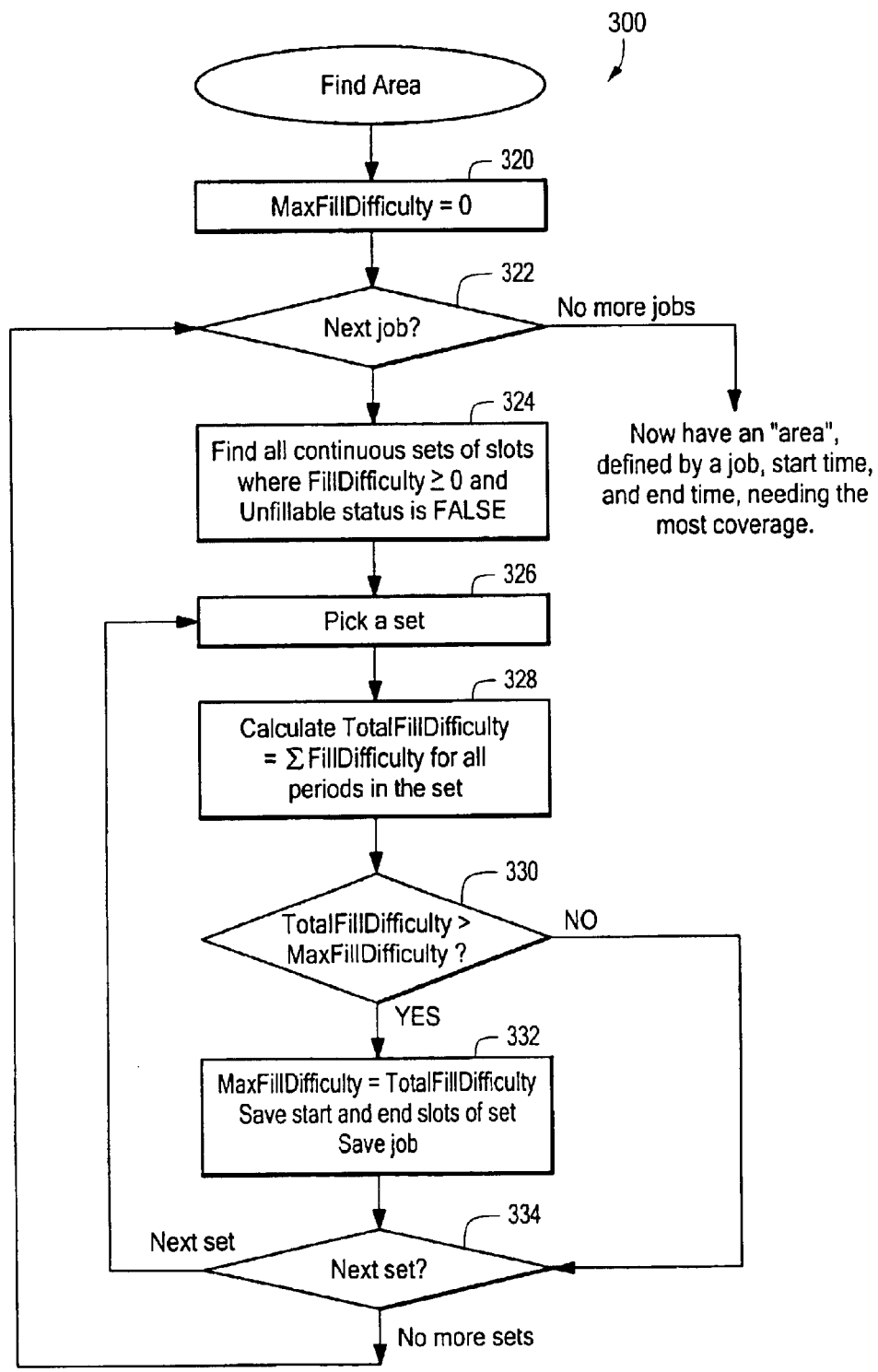
FIG. 15 is a detailed flowchart of the step of FIG. 14 showing how areas needing the most coverage are determined.

FIG. 15 is a flowchart showing the details of Step 300 of FIG. 14, in which the area having the most unfilled required coverage is determined. First, at Step 320, a variable Max-FillDifficulty is initialized to zero.

At Step 322, a determination is made as whether there are any jobs which have not been processed. If there are more jobs, one is selected and at Step 324, all continuous sets of slots (or periods) are found, where a continuous set of slots is a set of contiguous slots where each slot's FillDifficulty is greater or equal to 0, and each slot's Unfillable status, which is a temporary variable described more fully below, is FALSE.

At Step 326, one of these continuous sets is selected, and at Step 328, a TotalFillDifficulty is calculated by summing all FillDifficulty's over all periods of the selected set.

If, at Step 330, this total TotalFillDifficulty is found to be greater than some threshold, MaxFillDifficulty, then at Step 332, the threshold is updated to the value of TotalFillDifficulty, and the start and end slots of the selected set, and the job, are recorded.

If Total Fill Difficulty does not exceed the threshold, Step 332 is skipped.

At Step 334, if another set is available for processing, control returns to Step 326 and a new set is selected. On the other hand, if there are no more sets for the current job, control loops back to Step 322, and the process is repeated for the next job. If there are no more jobs, the area needing the most coverage has be found.

Thus, in Step 302 of FIG. 14, if MaxDifficulty is 0, no areas have been found.

Figure 16:
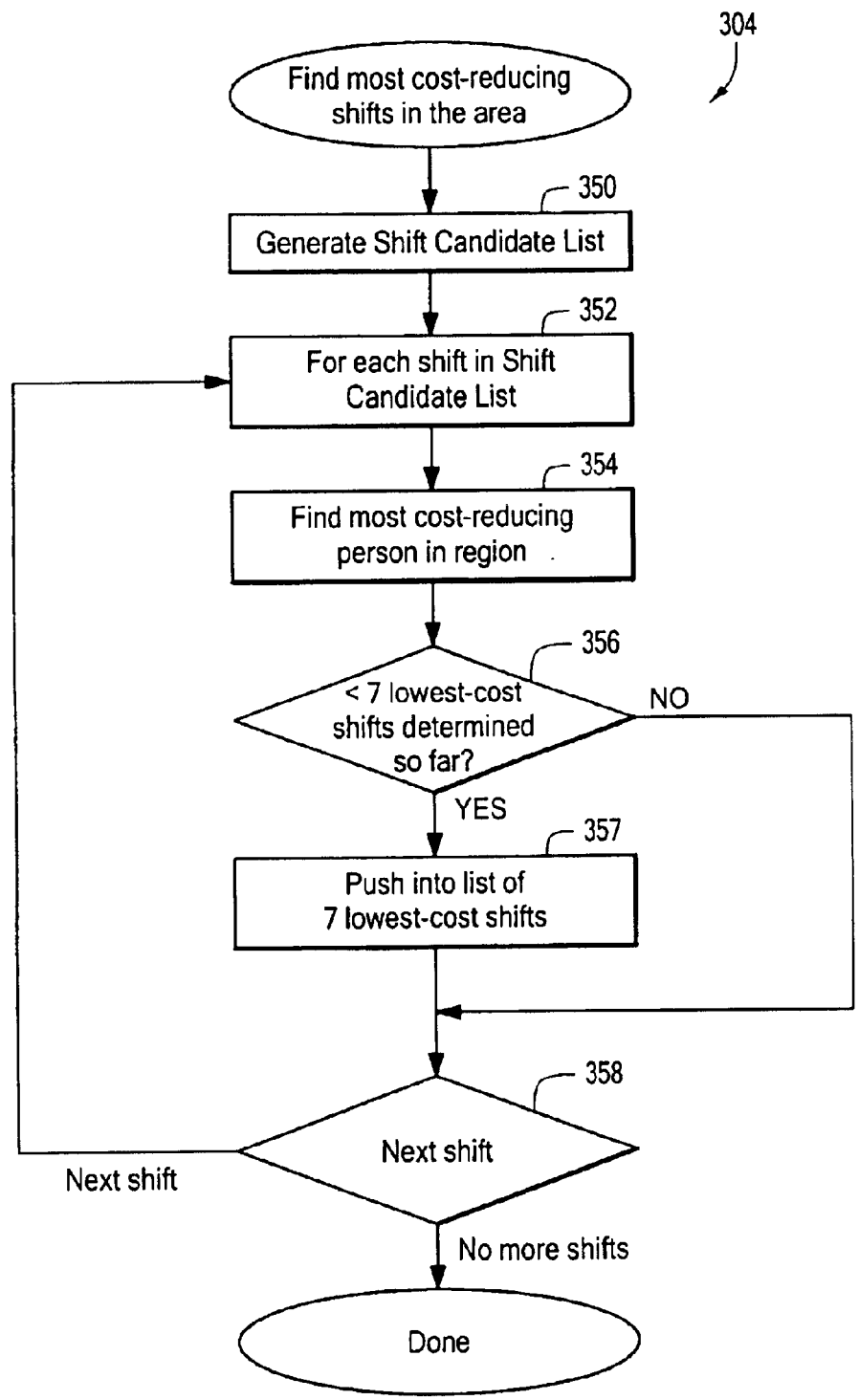
FIG. 16 is a detailed flowchart of the step of FIG. 14 showing how the most cost-reducing shift in an area is determined.

FIG. 16 is a flowchart showing the details of Step 304 of FIG. 14, in which the most cost-reducing shift in the area found in FIG. 15 is determined. First, in Step 350, a Shift Candidate List, that is, a list of shifts which could be scheduled in the area is generated. This is described in greater detail below with respect to FIG. 17. The Shift Candidate List holds the shift with the best coverage from each region. By generating the list in this manner, the widest possible set of employees to fill each of these shifts is obtained.

Next, the loop from Step 352 to Step 358 is executed for each shift in the Shift Candidate List. At Step 354, the most cost-reducing person in the region to fill that shift is found. At Step 356, if the overall cost of adding this shift is less than any of the seven lowest cost shifts determined so far, the shift with the highest cost of the seven is removed from the list of seven, and replaced with this new shift (step 357). Otherwise, step 357 is skipped. Of course, such a list could retain more or less than seven shifts.

Note that some randomness is introduced just as with the Remove Shift routine to keep the solution from getting stuck in a local optimum.

Figure 17:
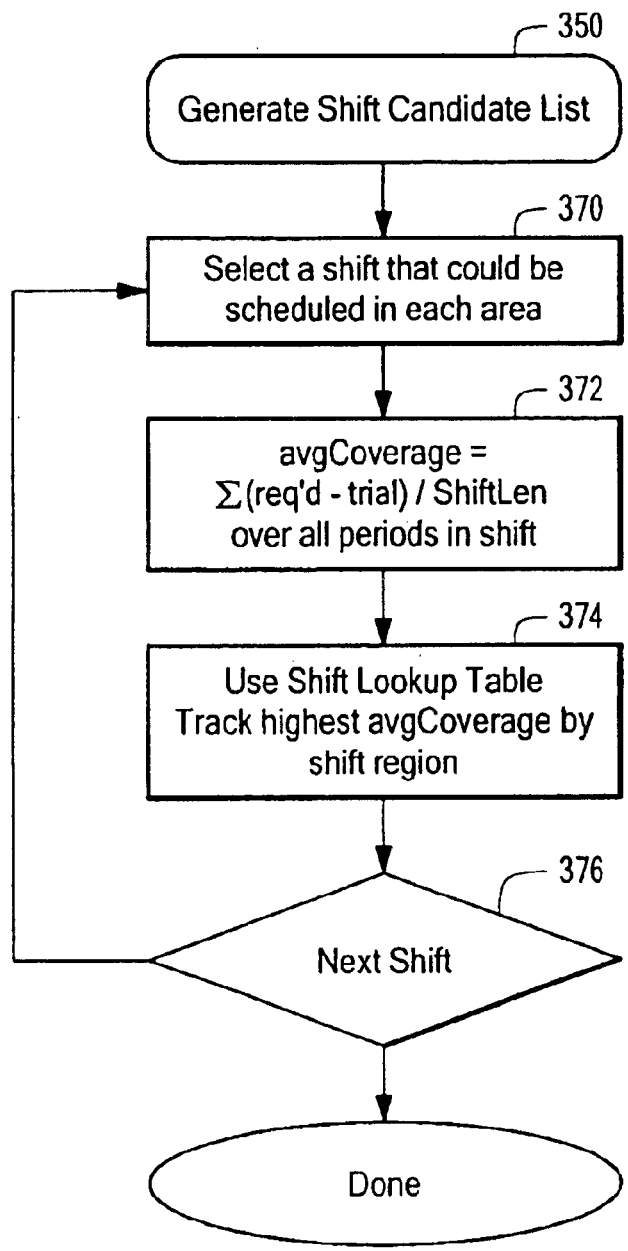
FIG. 17 is a detailed flowchart of the step FIG. 16 showing how a shift candidate list is generated.

FIG. 17 is a flowchart of Step 350 of FIG. 16. The loop defined by Steps 370 through 376 is executed for every possible shift that could be scheduled in each area. In Step 372, the average coverage of the shift, AvgCoverage, is calculated, where AvgCoverage=$\Sigma$ (Required−TrialScheduled)/ShiftLen, over all periods in the selected shift, and where ShiftLen is the length of the shift.

At Step 374, the ShiftLookupTable is used to track the highest AvgCoverage by shift region.

Figure 18A:
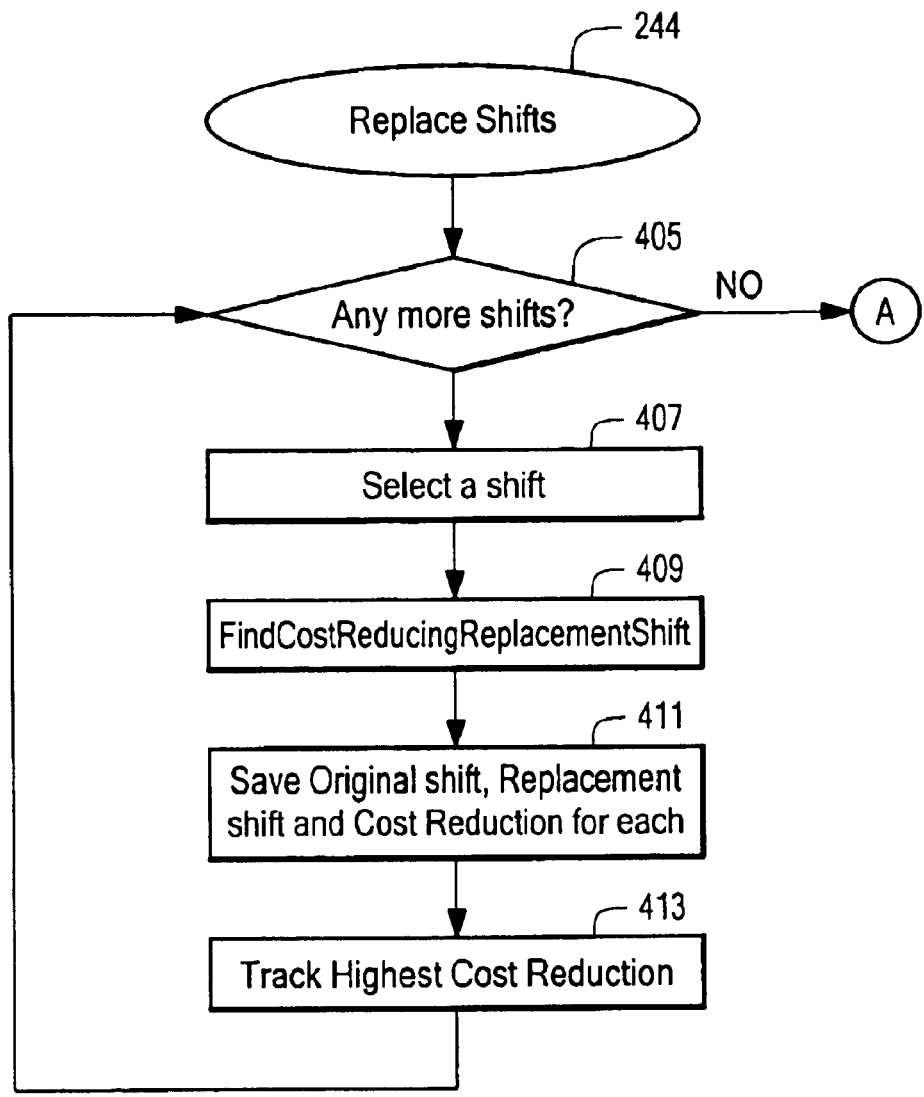
FIGS. 18A and 18B are a flowchart of the Replace Shifts Algorithm of FIG. 7.
Figure 18B:
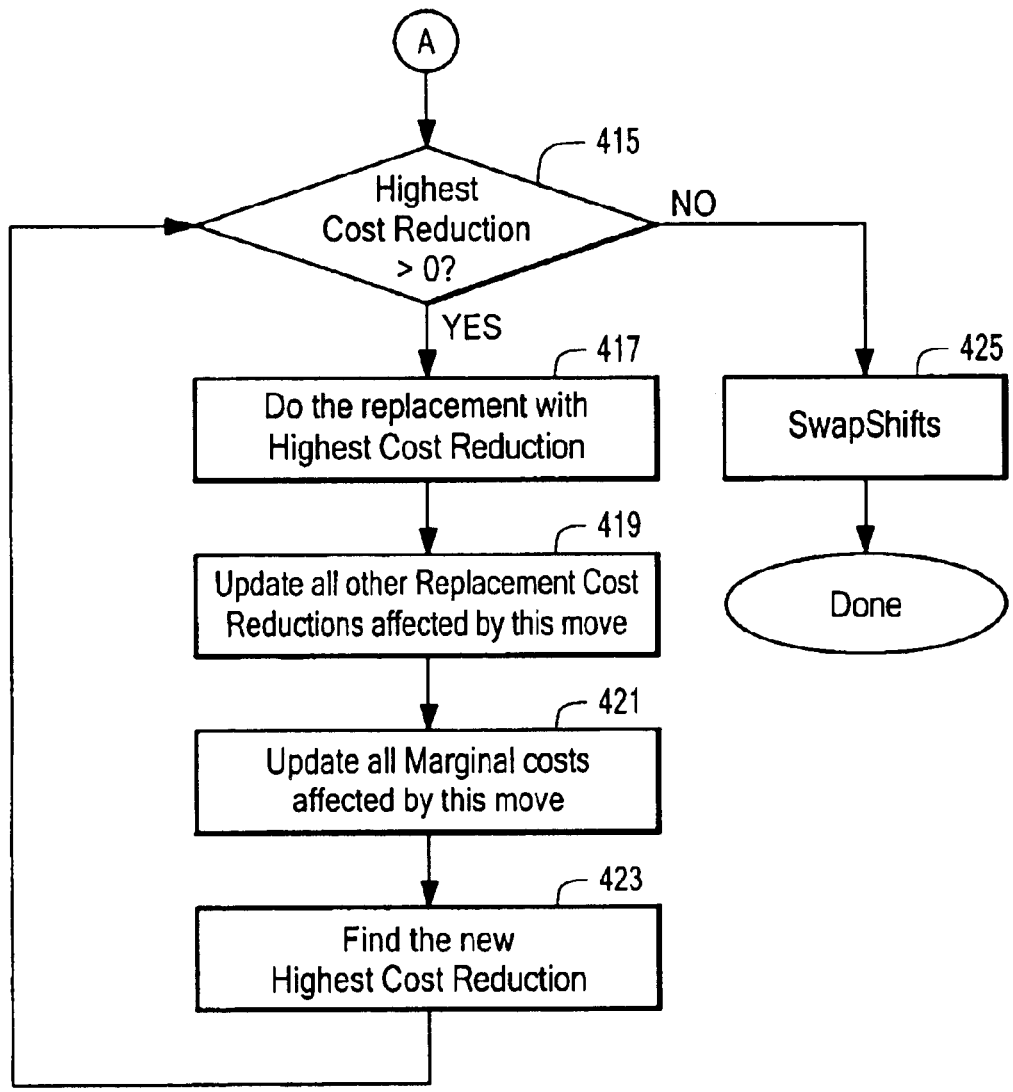

FIGS. 18A and 18B together are a flowchart of the Replace Shifts method 244 of FIG. 7. The Replace Shifts method 244 tries to find a replacement shift for each and every shift in the trial schedule, by first stretching, shrinking or moving breaks around within the shift. It does this efficiently by keeping track of the marginal costs in the Period Totals and the marginal dissatisfaction costs in the Employee Schedule object. Initially, a replacement shift is found and a replacement cost is calculated for every shift whose cost can be reduced. Then, repeatedly, the lowest cost replacement is found, the replacement is performed, and the replacement cost of the other shifts is recalculated if necessary. The cycle stops when no further cost reducing replacement shifts can be found.

After the replacements are made, every shift is analyzed to see if the shift can be swapped with that of another employee. In a preferred embodiment, the swapping transaction can be up to three stages deep, for example where employee A swaps with B, B swaps with C and C swaps with D.

Next the loop formed by Steps 405–411 is performed repeatedly for each scheduled shift. At Step 409, a cost reducing replacement shift is determined. Step 409 is discussed in greater detail below with respect to FIG. 19. At Step 411, the original shift, the replacement shift and cost reduction resulting from the replacement are saved. Note that if the determined replacement shift is null, the old shift is deleted but not replaced. Finally, at Step 413, the highest Cost Reduction is tracked, that is the Cost Reduction is saved if it is the highest encountered thus far.

After all shifts have been processed, the loop formed by Steps 415–423 is executed iteratively until the highest Cost Reduction is zero. At Step 417, the replacement associated with the highest cost reduction is performed. At Step 419, all other Replacement Cost Reductions affected by this action are updated. At Step 421, all Marginal costs affected by this action are updated. At Step 423, the new Highest Cost Reduction is determined.

Finally, when the highest cost reduction is zero, the loop terminates and, at Step 425, shifts are swapped. Step 425 is discussed in greater detail below with respect to FIG. 21.

Figure 19:
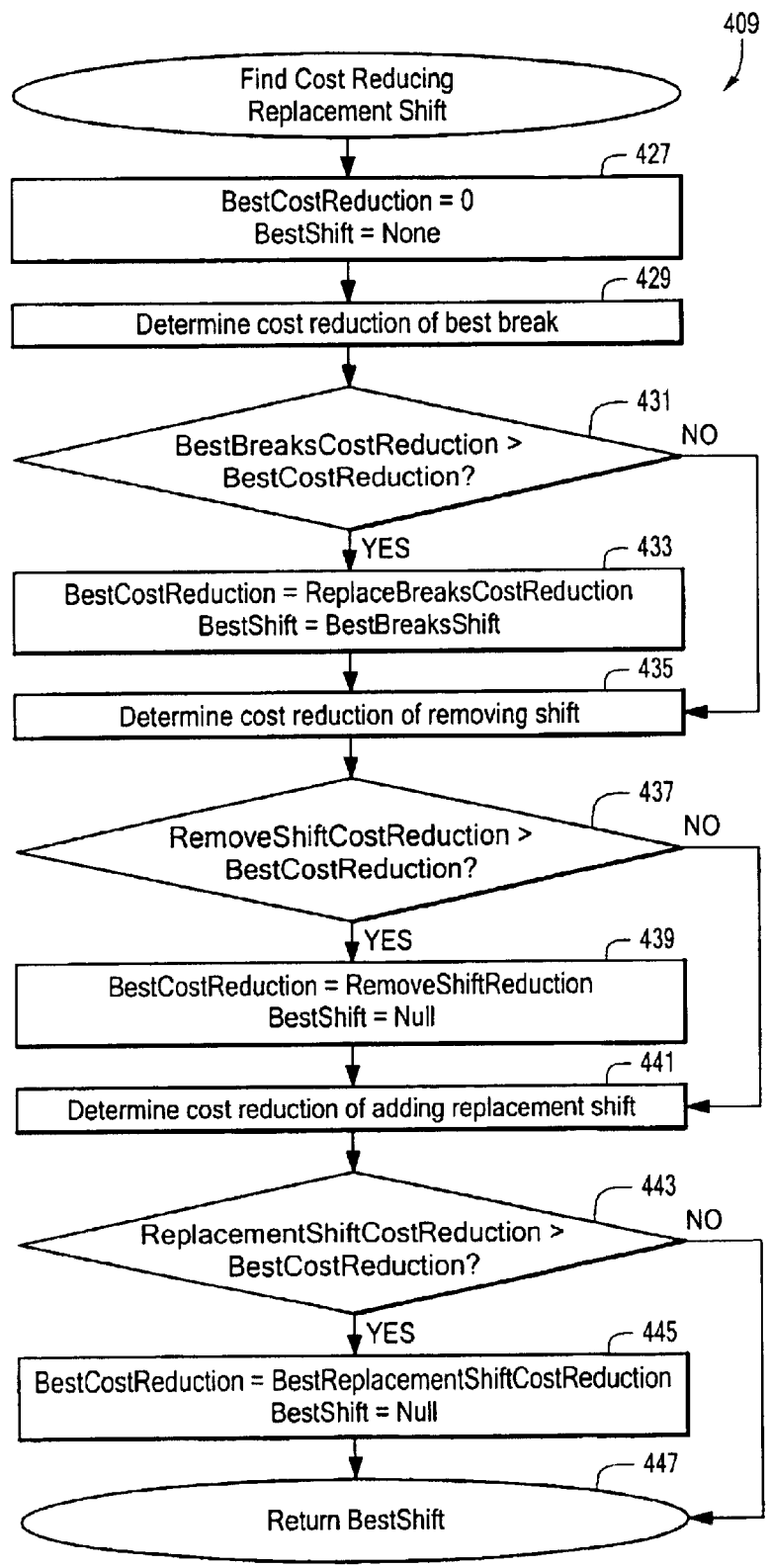
FIG. 19 is a detailed flowchart of the FindCostReducingReplacementShift procedure of FIG. 18A.

FIG. 19 is a detailed flowchart of the process of finding a cost-reducing replacement shift, Step 409. First, at Step 427, Best Cost Reduction is set to 0, and Best Shift is set to None. At Step 429, the best breaks, i.e., the best positions for breaks, are found. If, at Step 431, Best Breaks Cost Reduction>Best Cost Reduction, then Step 433 is executed, in which Best Cost Reduction is set equal to Replace Breaks Cost Reduction, and Best Shift is set equal to Best Breaks Shift. Execution proceeds to Step 435, regardless of the determination at Step 431.

At Step 435, the cost reduction of removing the shift is determined. If, at Step 437, it is determined that Remove Shift Cost Reduction>Best Cost Reduction, then at Step 439, Best Cost Reduction is set to Remove Shift Cost Reduction and Best Shift is set to null. Otherwise, Step 439 is skipped.

At Step 441, the best replacement shift is found and the cost reduction of adding the replacement shift, ReplacementShiftCostReduction, determined. Step 441 is discussed in greater detail below, with respect to FIG. 20.

If, at Step 443, it is determined that ReplacementShiftCostReduction>Best Cost Reduction, then at Step 445, Best Cost Reduction is set to Best Replacement Shift Cost Reduction, and Best Shift is set to Best Replacement Shift. Otherwise, Step 445 is skipped.

At Step 447, the BestShift is returned to the calling routine.

Figure 20:
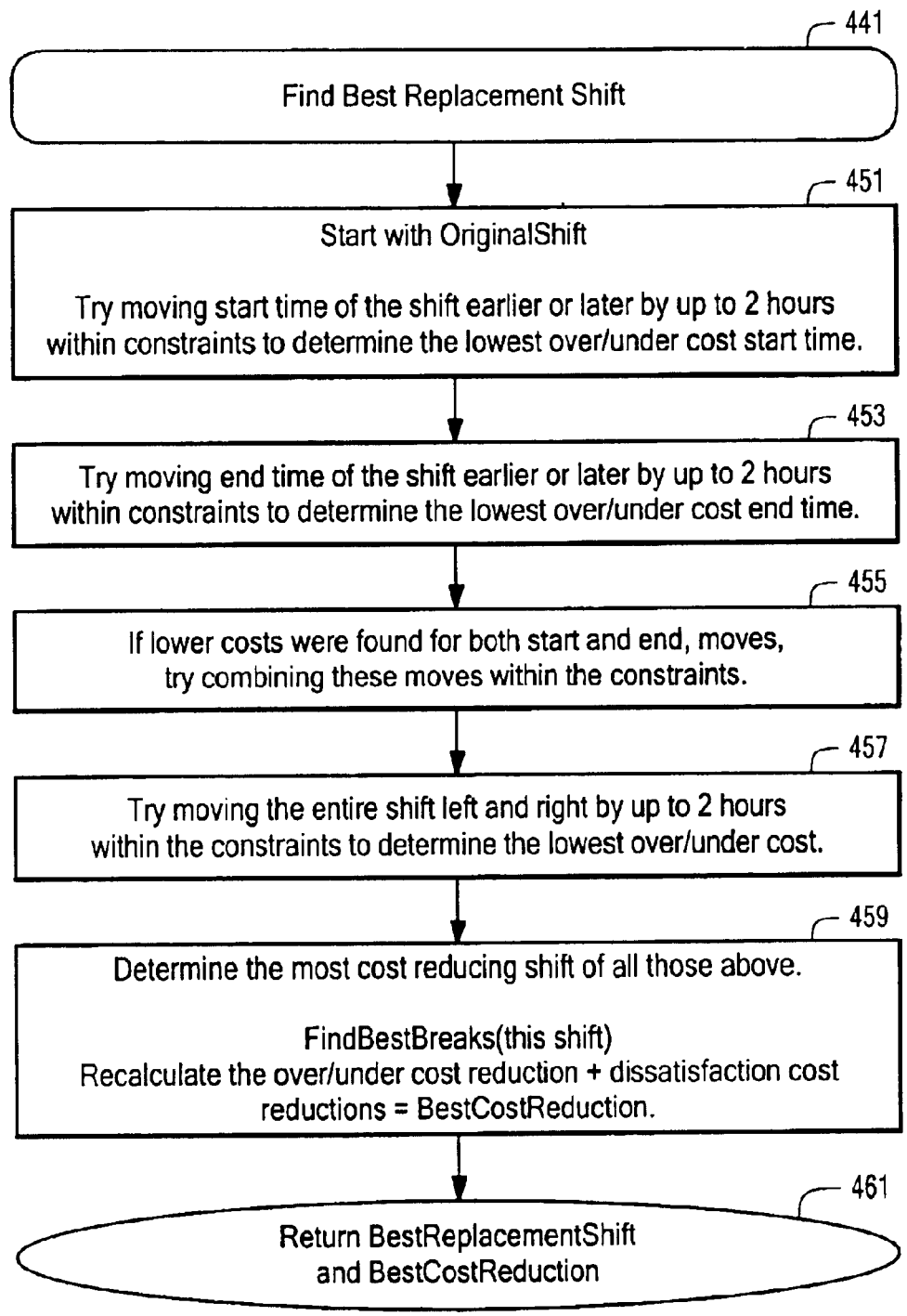
FIG. 20 is a detailed flowchart of the FindBestReplacementShift procedure of FIG. 19.

FIG. 20 is a detailed flowchart of Step 441. Beginning, at Step 451, with the original shift, the lowest over/under cost start time is determined by evaluating different scenarios in which the shift's start time is moved earlier and later by up to 2 hrs within constraints.

Similarly, at Step 453, the lowest over/under cost end time is determined by evaluating different scenarios in which the shift's end time is moved earlier and later by up to 2 hrs within constraints.

At Step 455, if lower costs were found by moving both start time (Step 451) and end time (Step 453), then combinations of these moves, within the constraints, are examined.

At Step 457, the entire shift is moved earlier or later by up to 2 hrs within constraints to determine the lowest over/under cost.

At Step 459, the most cost reducing shift is selected from all of the above. The best breaks for this shift are determined for this new Best Replacement Shift. The over/under cost reduction is recalculated and added to the dissatisfaction cost reductions to yield the Best Cost Reduction.

At Step 461, the Best Replacement Shift and Best Cost Reduction are returned.

Figure 21:
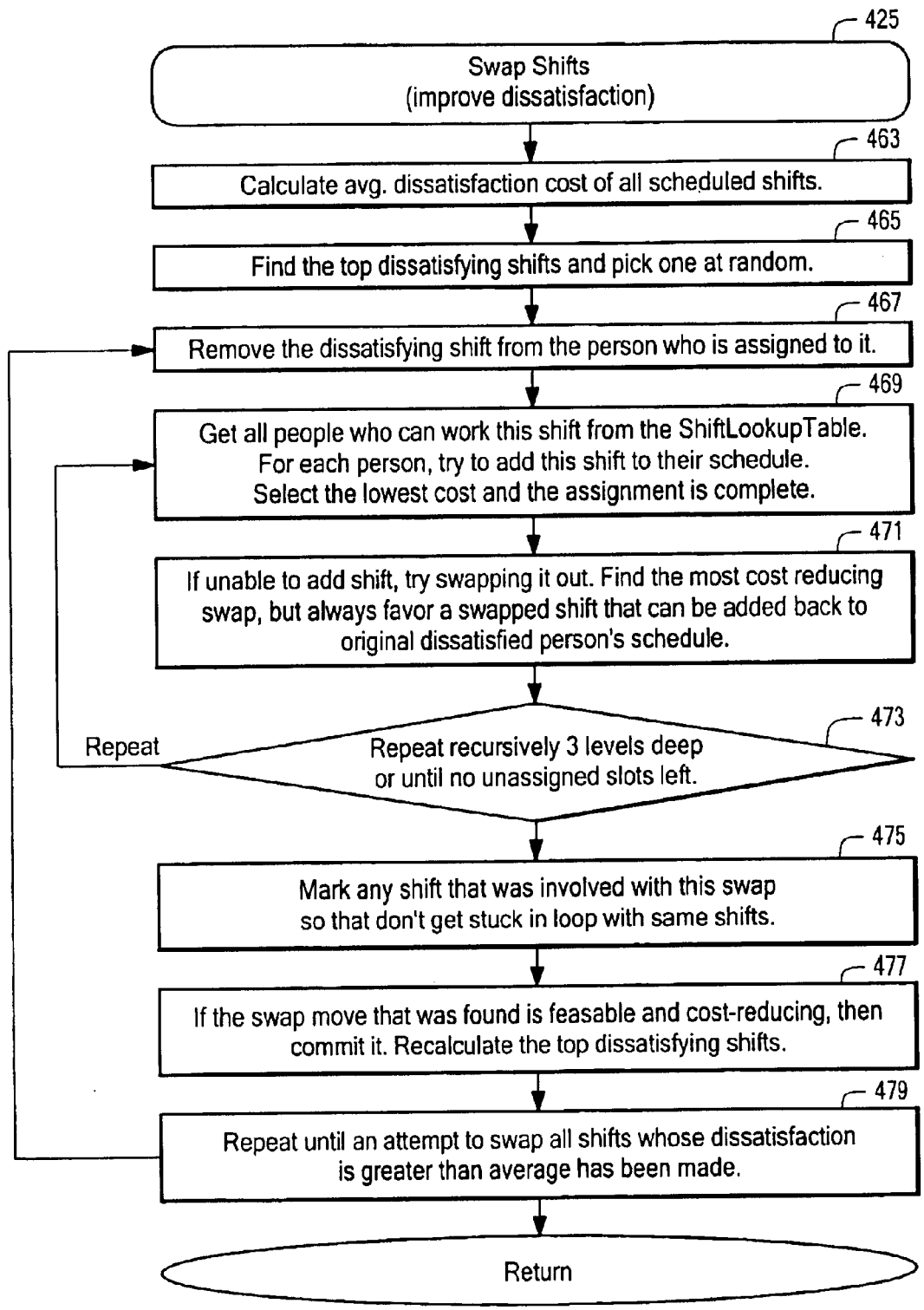
FIG. 21 is a flowchart of the SwapShifts procedure of FIG. 18B.

FIG. 21 is a detailed flowchart of Step 425, in which employees are swapped between shifts in an effort to improve dissatisfaction costs. Note that this routine only performs swapping and has no effect on the over/under cost. The goal here is only to improve the dissatisfaction cost.

At Step 463, the average dissatisfaction cost of all the scheduled shifts is calculated. At Step 465, the top dissatisfying shifts are determined. One of these shifts is randomly selected, and an attempt to swap the employee assigned to it with another employee is made as described next.

The loop defined by Steps 467–479 is repeated until the process has attempted to swap all shifts whose dissatisfaction cost is greater than average.

At Step 467, the dissatisfying shift is removed from the person to whom it is currently assigned. Now the shift is unassigned. To assign the shift, Steps 469, 471 and 473 are repeated recursively up to 3 levels deep or until there are no unassigned shifts.

At Step 469, all of the employees who can work this shift are obtained from the shift lookup table. For each employee, an attempt is made to add this shift to the employee's schedule. The employee with the lowest cost is assigned to the shift and the assignment is complete.

If, on the other hand, the shift could not be added, then at Step 471, an attempt is made to swap it out. The most cost-reducing swap is found, but a swapped shift which can be added back to the original dissatisfied person's schedule is always favored.

After exiting the loop of Steps 469–473, at Step 475, any shift that was involved in this swap move is marked so that a loop involving the same shifts does not occur.

At Step 477, if the swap move that was found is feasible and cost-reducing, then it is committed, and the top dissatisfying shifts are recalculated.

Step 479 causes the loop of Steps 467–479 to repeat until the process has attempted to swap all shifts whose dissatisfaction is greater than average.

It will be apparent to those of ordinary skill in the art that methods involved in the scheduler may be embodied in a computer program product that includes a computer usable medium and wherein the steps of the method disclosed herein are performed by a computer. For example, such a computer usable medium can include a readable memory device, such as a hard drive device, a CD-ROM, a DVD-ROM, or a computer diskette, having computer readable program code segments stored thereon, The computer readable medium can also include a communications or transmission medium, such as a bus or a communications link, either optical, wired, or wireless having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of dynamically scheduling a workforce, comprising:

performing by a computer the steps of:

a) determining workforce requirements for a given time period;

b) determining, responsive to the workforce requirements, an initial workforce schedule for the given time period by determining shifts and assigning employees to the shifts, designating the initial workforce schedule as a trial workforce schedule and a best workforce schedule, and determining a value associated with the best workforce schedule responsive to the best workforce schedule, the workforce requirements and employee preferences, wherein said value is a weighted sum of overscheduling and underscheduling over all periods and all jobs for a given duration and employee dissatisfaction over all employees;

and wherein employee dissatisfaction is a weighted sum of:

a number of hours that the employee spends working outside the employee's preferred availability;

a number of hours that the employee spends working outside the employee's preferred jobs;

a number of hours that the employee spends working on the employee's preferred day off; and a difference between a number of scheduled hours and a number of preferred hours;

c) modifying the trial workforce schedule;

d) determining a value associated with the trial workforce schedule responsive to the trail workforce schedule, the workforce requirements and employee preferences;

e) if the value associated with the trial workforce schedule indicates a better match to the workforce requirements than a value associated with the best workforce schedule, designating the trial workforce schedule as the best workforce schedule;

f) repeating steps c) through e) for a predetermined number of iterations; and g) selecting the best workforce schedule.

2. A method of dynamically scheduling a workforce, comprising:

performing by a computer the steps of:

determining workforce requirements for a scheduling cycle;

determining a workforce schedule satisfying a set of constraints such that an objective function $f$ responsive to the workforce requirements, the workforce schedule and employee preferences, is minimized over a set of candidate workforce schedules;

said objective function is given by $f = W_{ro}\Sigma\Sigma o_{ij} + W_{ru}\Sigma\Sigma u_{ij} + W_d \Sigma w_k d_k$ where $\Sigma\Sigma o_{ij}$ = total number of minutes overscheduled for all periods i and all jobs j, $W_{ro}$ = weighting factor or penalty factor associated with overscheduling any job during any period, $\Sigma\Sigma u_{ij}$ = total number of minutes underscheduled for all periods i and all jobs j, $W_{ru}$ = weighting factor or penalty factor associated with underscheduling any job during any period, $\Sigma w_k d_k$ = sum of dissatisfactions of all employees k, each employee's dissatisfaction being weighted by $w_k$, and $W_d$ = overall weighting factor or penalty factor of total employee dissatisfaction, wherein employee dissatisfaction is responsive to employee preferences.

3. The method of claim 2 wherein each employee's weighting factor $w_k$ is responsive to one or many of seniority, work status and age.

4. The method of claim 2 wherein an employee's dissatisfaction is given by:

$$d_k = w_{ak}d_{ak} + w_{jk}d_{jk} + w_{ok}d_{ok}b + w_{hk}d_{hk}$$

where $w_{ak}$ is a weighting factor for preferred availability for employee k, $d_{ak}$=number of hours that employee k spends working outside his preferred availability, $w_{jk}$ is a weighting factor for preferred job for employee k, $d_{jk}$=number of hours that employee k spends working outside his preferred job, $w_{ok}$ is a weighting factor for preferred days off for employee k, $d_{ok}$=number of hours that employee k spends working on his days off, $w_{hk}$ is a weighting factor for preferred hours per week for employee k, and $d_{hk}$=abs(scheduled−preferred) hours for the week for employee k.

5. The method of claim 4 wherein a job is ranked from 0% to 100% for each employee, the ranking being an additional weighting factor for $d_k$.

6. The method of claim 2 wherein $W_{ro}=W_{ru}=1/60$, and wherein $W_d=R_d$ where $R_d$ is a user-configured ratio from 0.0 to 1.0.

7. The method of claim 6 wherein $w_k$ is proportional to 1/k where k indicates seniority.

8. The method of claim 7 wherein $$W_d = f_d * R_d$$

where $$f_d = n \left/ \left( \sum_{i=1}^{n} 1/i \right) \right.$$

where n is the number of employees.

9. The method of claim 2 wherein the periods are for 15 minutes.

10. The method of claim 2 wherein the constraints comprise minor rules.

11. The method of claim 2 wherein the constraints comprise break rules.

12. The method of claim 2 wherein each scheduling cycle has a duration of one week.

* * * * *

UNITED STATES PATENT AND TRADEMARK OFFICE
CERTIFICATE OF CORRECTION

PATENT NO. : 6,823,315 B1
DATED : November 23, 2004
INVENTOR(S) : Mark E. Bucci et al.

It is certified that error appears in the above-identified patent and that said Letters Patent is hereby corrected as shown below:

Column 6,
Line 9, "$S_{current}$" should read -- $S_{best}$ --.

Signed and Sealed this

Fourteenth Day of February, 2006

JON W. DUDAS
*Director of the United States Patent and Trademark Office*